United States Patent [19]

Morrissey et al.

[11] Patent Number: 5,463,762
[45] Date of Patent: Oct. 31, 1995

[54] I/O SUBSYSTEM WITH HEADER AND ERROR DETECTION CODE GENERATION AND CHECKING

[75] Inventors: Douglas E. Morrissey, Exton; Edward T. Cavanagh, Jr., Norristown; Kin H. Ng, Glenmoore, all of Pa.

[73] Assignee: Unisys Corporation, Blue Bell, Pa.

[21] Appl. No.: 176,547

[22] Filed: Dec. 30, 1993

[51] Int. Cl.⁶ .................................................. G06F 1/00
[52] U.S. Cl. ........................ 395/185.02; 364/236.2; 364/238.3; 364/DIG. 1; 395/185.05; 395/182.01; 395/850
[58] Field of Search .................... 395/575, 275, 395/250; 364/238.2, 238.3, 239.6, 239.7, 240.8, 242.2; 371/37.1, 37.7, 2.1, 48, 49.1; 370/60, 85.15

[56] References Cited

U.S. PATENT DOCUMENTS

| | | | |
|---|---|---|---|
| 4,486,739 | 12/1984 | Franaszek et al. | |
| 4,514,823 | 4/1985 | Mendelson et al. | |
| 4,768,190 | 8/1988 | Giancarlo. | |
| 4,777,595 | 10/1988 | Strecker et al. | |
| 4,805,090 | 2/1989 | Coogan | 364/200 |
| 4,866,609 | 9/1989 | Calta et al. | |
| 4,872,160 | 10/1989 | Hemmady et al. | 370/60 |
| 4,875,206 | 10/1989 | Nichols et al. | 370/85.15 |
| 4,899,333 | 2/1990 | Roediger | 370/60 |
| 5,007,051 | 4/1991 | Dolkas et al. | 370/85.1 |
| 5,107,489 | 4/1992 | Brown et al. | 370/58.2 |
| 5,133,078 | 7/1992 | Minassian et al. | |
| 5,185,862 | 2/1993 | Casper et al. | 395/250 |
| 5,235,595 | 8/1993 | O'Dowd. | |
| 5,243,596 | 9/1993 | Port et al. | |
| 5,243,699 | 9/1993 | Nickolls et al. | 395/275 |
| 5,329,625 | 7/1994 | Kannan et al. | 395/275 |
| 5,371,897 | 12/1994 | Brown et al. | 395/275 |

FOREIGN PATENT DOCUMENTS

0402295A1 12/1990 European Pat. Off..
0412268A2 2/1991 European Pat. Off..

OTHER PUBLICATIONS

IBM, "ESA/390™ Channel Connectivity", brochure.
IBM Corporation, "Enterprise Systems Architecture/390, ESCO I/O Interface", SA22-7202-01, Sep. 1991.
"Am79168/Am79169TAXIchip™" Transmitter/ Receiver PRELIMINARY, Feb. 1991.

Primary Examiner—Robert W. Beausoliel, Jr.
Assistant Examiner—Albert Decady
Attorney, Agent, or Firm—Ratner & Prestia

[57] ABSTRACT

Apparatus is provided for use in an Input/Output (I/O) subsystem. The I/O subsystem is coupled to a serial data transfer medium that transmits data from a sender to a recipient. The I/O subsystem processes a frame comprising user defined data and frame control data. The frame is received over the serial data transfer medium. The apparatus includes a mechanism for receiving and validating the frame from the serial data transfer medium. The receiving mechanism transmits the user defined data to a first-in, first-out (FIFO) buffer. A mechanism is provided for forming a block header. The block header comprises control data that are used by the recipient of the user defined data. The block header forming mechanism is distinct from the FIFO buffer. A switching mechanism is coupled to receive the block header and a subset of the user defined data. The recipient has a parallel storage medium. The switching mechanism transmits either the block header or the subset of the user defined data to the parallel storage medium. A control mechanism provides signals to configure the switching mechanism to alternately transmit the block header and the subset of the user defined data to the parallel storage medium. By alternating the block header and data, a data block is formed having a size that equals the native sector size of the recipient.

20 Claims, 16 Drawing Sheets

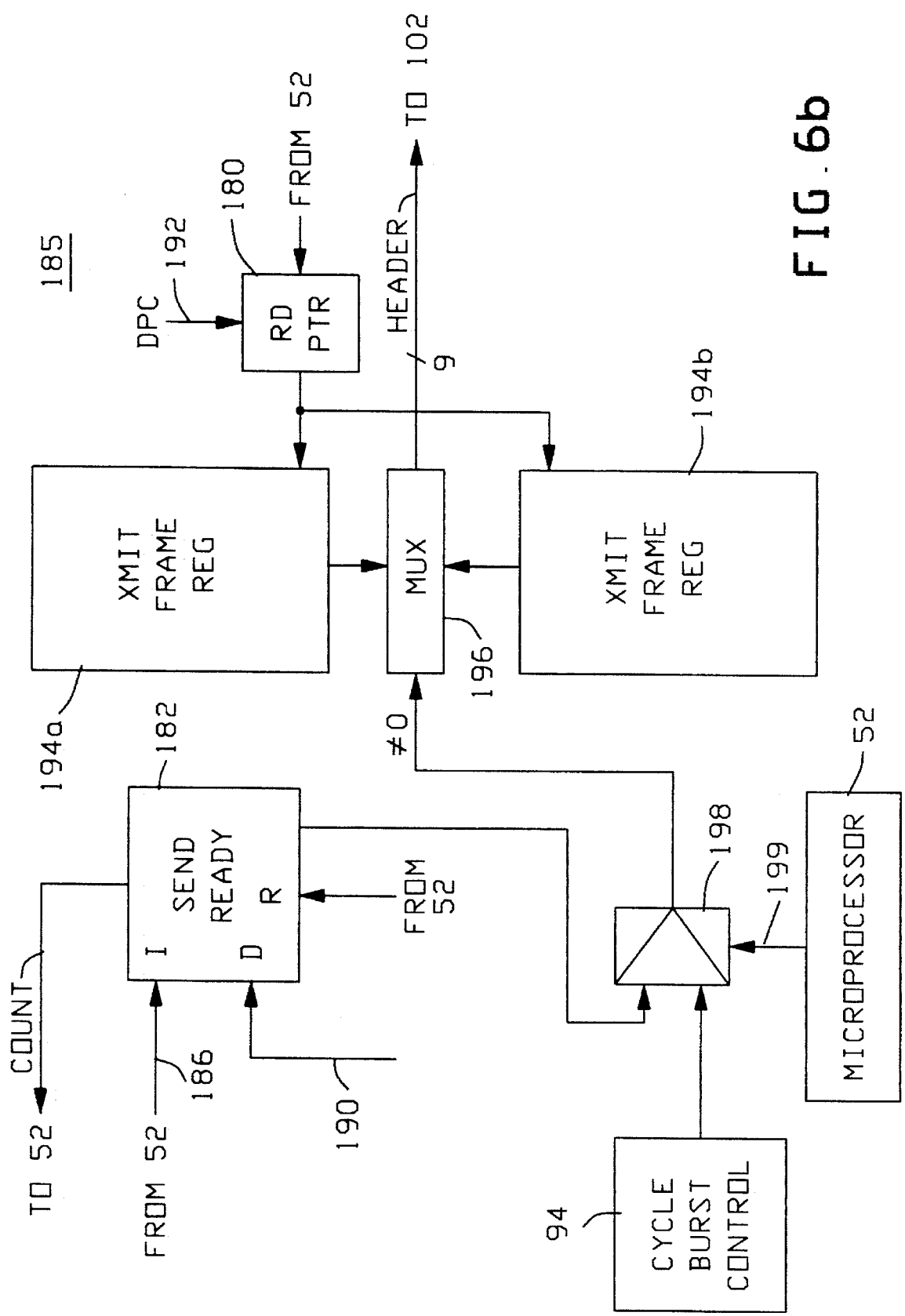

I/O SUBSYSTEM WITH HEADER AND ERROR DETECTION CODE GENERATION AND CHECKING

The present invention relates to input/output (I/O) subsystems for automated data processing equipment, and in particular to I/O subsystems employing serial protocols.

BACKGROUND OF THE INVENTION

An Input/Output (I/O) channel subsystem is used to transfer information between I/O devices and the main storage of a host processor. An I/O channel, for example, may connect the host directly to a mass storage device (e.g., disk or tape drive). In the case of a mainframe host processor, the channel is usually coupled to one or more device controllers. Each device controller is in turn connected to a plurality of mass storage devices.

The I/O channel subsystem typically has an independent I/O processor which asynchronously controls the movement of data between the external devices and system memory. This allows data processing by an execution unit to proceed simultaneously with I/O operations. By offloading the low-level I/O management tasks from the execution unit to the I/O processor, system throughput is enhanced.

I/O channel subsystems use distinct physical media and I/O protocols that differ from the communications media and protocols used in communications networks. Throughout the 1980's, the typical I/O subsystem in large processing systems used a copper "bus and tag" medium and a parallel channel protocol. Parallel channels were limited in distance to about 130 meters between the host and an attached device. In recent years, the use of fiber optic I/O channels and serial I/O protocols has gained wide acceptance. These channels have advantages of higher data rate and longer allowable separation between the host and the attached devices.

An exemplary serial I/O channel protocol is defined in the ESCON I/O Interface specification, Document No. SA22-7402-02, published by IBM Corporation, 1991, which is incorporated herein by reference for its teachings on I/O channel protocols. ESCON™ is a trademark of the IBM corporation.

In the ESCON protocol, as in other protocols, information is transmitted by the channel organized into frames. The frames include control information (e.g., source address, destination address, pacing information for dynamically adjusting the flow of frames in both directions, link control information, etc.) and may contain user defined data. Link-Control frames are exchanged between a host and a device controller to establish and maintain a logical connection between them. Device level frames control I/O operations and are used to transfer data. All of the frames include a start-of-frame (SOF) delimiter, a header, a cyclical redundancy checksum (CRC) and an end-of-frame (EOF) delimiter. Data frames include user defined data after the header.

An SOF may be a connect SOF (CSOF), which establishes a dynamic link, or a passive SOF (PSOF), which is sent if a dynamic link is already established. An EOF may be a passive EOF (PEOF), a disconnect EOF (DEOF) or an abort EOF (AEOF). A PEOF is sent if the dynamic link will remain connected after the EOF is sent. A DEOF causes disconnection of the dynamic link after processing the frame that ended with the DEOF. An AEOF, or abort delimiter, is sent if the sender detects an error condition and is unable to complete the transmission of a normal frame. The recipient of a frame ending with an AEOF discards the frame.

The ESCON™ protocol specifies use of a defined set of 10 bit sequences forming normal "D" data characters and special "K" characters. The K and D characters are defined in U.S. Pat. No. 4,486,739 to Franaszek et al., which is hereby incorporated by reference therefore. The D characters are encoded from/decoded into eight bit combinations. The K characters only have meaning within "ordered sets". The ordered sets include K characters and combinations of K and D characters in predetermined sequences. These ordered sets provide for delineation of frames, control of I/O links (between host I/O subsystem and device I/O subsystem), and synchronization between sender and recipient.

U.S. Pat. No. 5,133,078 to Minassian et al. describes a serial frame processing system for processing incoming data asynchronously from the circuits in which the data are later processed. An In Buffer Fill State Machine checks the frame, including the CRC characters for validity and stores the frame in an Input Buffer (IB). An In Frame State Machine (IFRSM) extracts portions of the frame from the IB for decoding and moves the remaining portion of the data into an output buffer.

Minassian et al. describe checking incoming frames (checking the CRC and ensuring that the frame includes an SOF and an EOF) while the Device Information Block (DIB) is being received. Additional processing of incoming frames which is asynchronous from the operations of the microprocessor controlling the channel is desired.

SUMMARY OF THE INVENTION

The present invention is apparatus for use in an Input/Output (I/O) subsystem. The I/O subsystem is coupled to a serial data transfer medium that transmits data from a sender to a recipient that has a parallel storage medium. The I/O subsystem processes a frame comprising user defined data and frame control data. The frame is received over the serial data transfer medium.

The apparatus includes a mechanism for receiving and validating the frame from the serial data transfer medium. The receiving mechanism transmits the user defined data to a first-in, first-out (FIFO) buffer.

A mechanism is provided for forming a block header. The block header comprises control data that are used by the recipient of the user defined data. The block header forming mechanism is distinct from the FIFO buffer.

A switching mechanism is coupled to receive the block header and a subset of the user defined data. The switching mechanism transmits either the block header or the subset of the user defined data to the parallel storage medium of the recipient.

A control mechanism provides signals to configure the switching mechanism to alternately transmit the block header and the subset of the user defined data to the parallel storage medium. By alternating the block header and data, a data block is formed having a size that equals the native sector size of the recipient.

BRIEF DESCRIPTION OF THE FIGURES

FIG. 6b is a block diagram of a second exemplary transmits frame register logic function.

DETAILED DESCRIPTION

OVERVIEW

Figure 1:
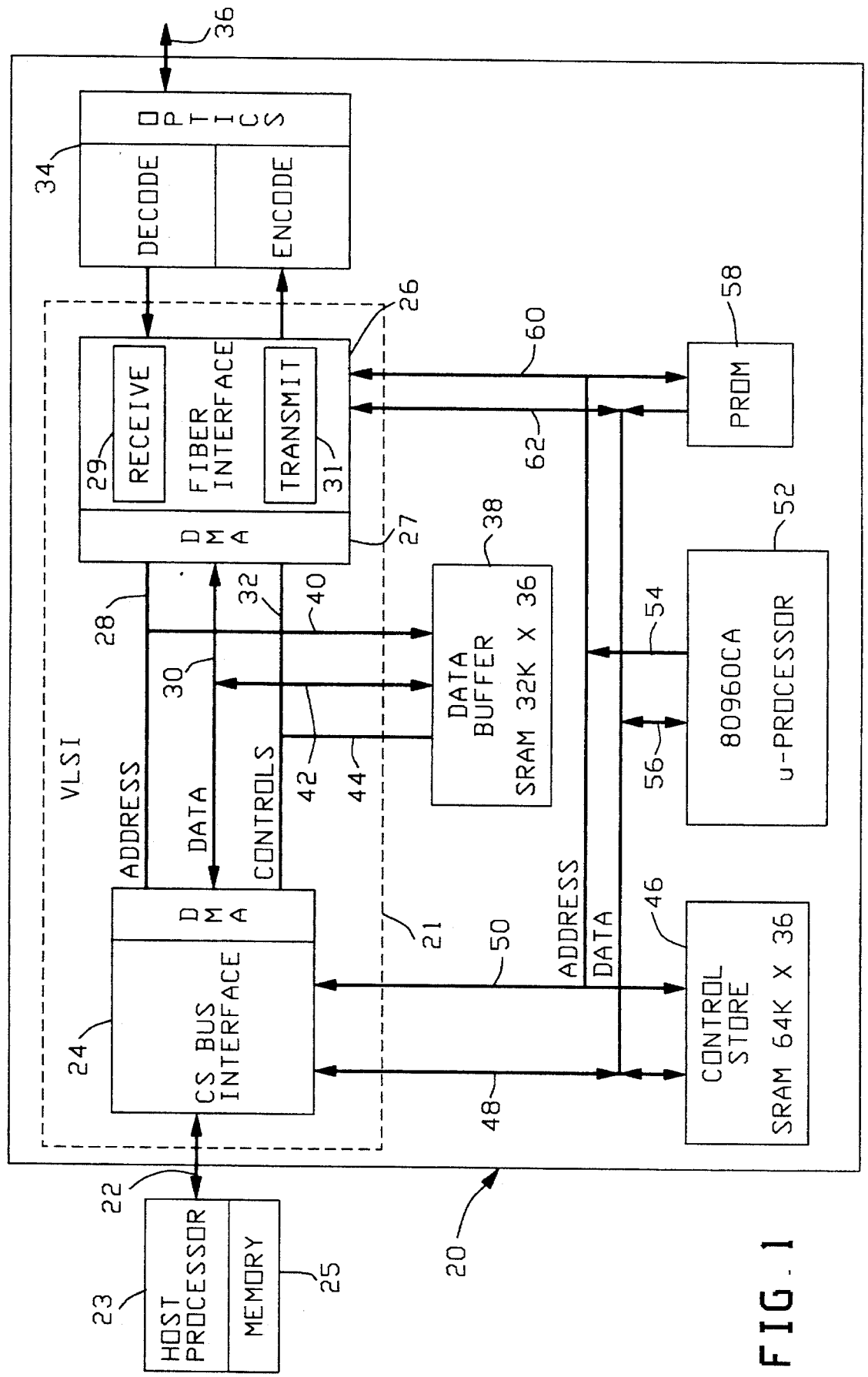
FIG. 1 is a block diagram of an exemplary system according to the present invention

Referring first to FIG. 1, the present invention is an apparatus and method for transferring user defined data between a parallel storage medium 38 and a serial link driver 34.

The apparatus is suitable for use in the I/O channel 20 of a processor system 23, such as a 2200 series system manufactured by the UNISYS corporation of Bluebell, Pa. If processor 23 is a mainframe computer, the parallel storage medium may be a data buffer 38 for receiving and storing a portion of the information stored in the main memory 25 of the processor 23. A bus interface 24 couples the parallel storage medium 38 to the bus of the mainframe. The bus interface is used to transfer data to data buffer 38 during an output operation, and to receive the data from data buffer 38 during a receive operation. The Small Computer Systems Interface (SCSI) channel interface of the UNISYS A Series processor system is an example of a bus interface that performs this function. Processor 23 may also include a microcomputer (not shown), in which case the parallel storage medium may be the main random access memory (RAM) of the microcomputer; a separate bus interface 24 need not be used when implementing the invention in a microcomputer.

Figure 14:
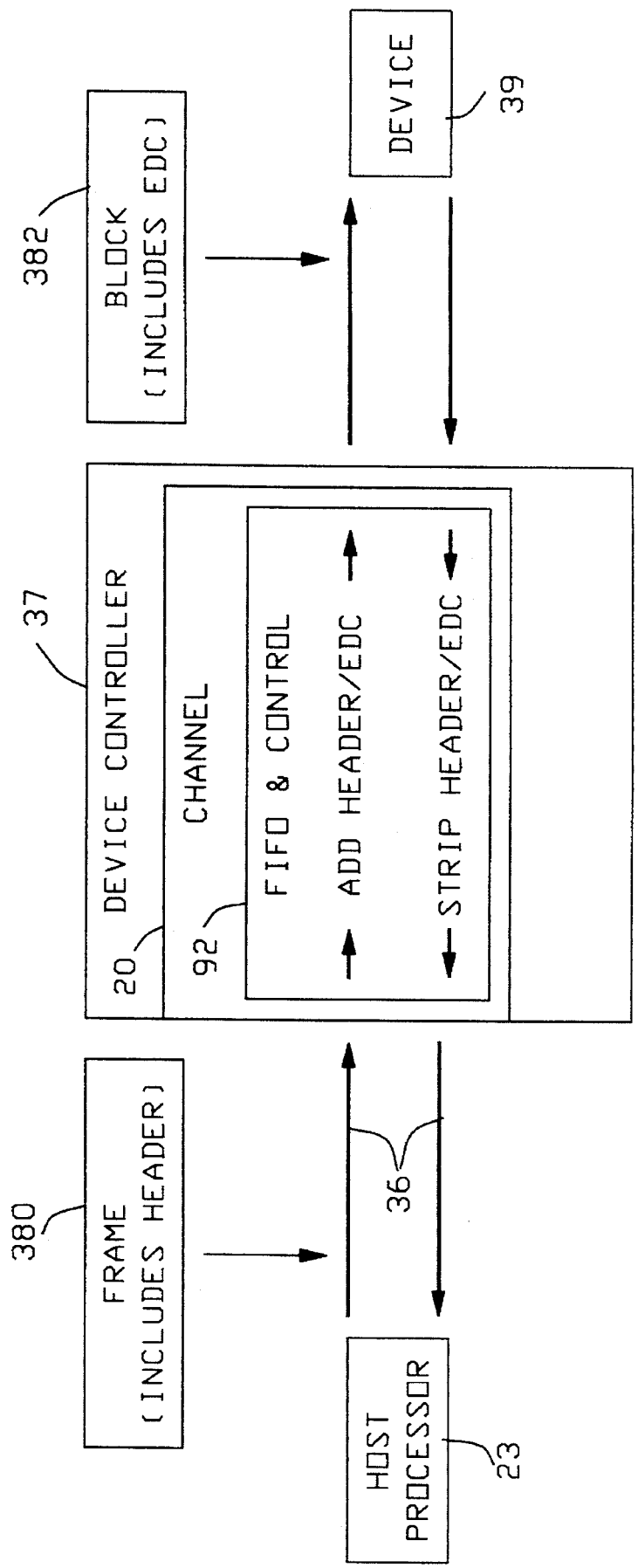
FIG. 14 is a block diagram showing a device controller including an I/O channel according to the invention, coupled to the host system shown in FIG. 1.

The apparatus is also suitable for use in the I/O channel 20 of a device controller 37 (shown in FIG. 14). The device controller channel communicates with the I/O channel of a processor such as host 23. In the case of a device controller 37, the parallel storage medium may be a buffer identical to data buffer 38 (FIG. 1), which is used to store a portion of the data in a mass storage device 39 attached to the device controller 37.

Referring again to FIG. 1, the serial link driver 34 transmits a frame of data over a serial data transfer medium 36, or receives a frame of data from the serial medium 36. The serial link driver 34 may be, for example, a conventional Am79168/Am79169 TAXichip™ Transmitter/Receiver chip set manufactured by Advanced Micro Devices.

According to one aspect of the invention, a parallel storage medium 38 receives the user defined data from the processor 23 via a bus interface 24. The data buffer 38 has sufficient storage space to simultaneously store enough data to form several data frames. The same data buffer 38 may also be used to store user defined data received over the serial transfer medium 36, before forwarding the user defined data to the host processor 23. The exemplary serial data transfer medium 36 is an optical fiber, but the serial medium may also be coaxial cable. A fiber interface facility 26 converts the data into a serial stream and forms frames for transmission over the serial data transfer medium 36. The fiber interface facility 26, in conjunction With the microprocessor 52 implements the rules of the channel I/O protocol that is used.

The fiber interface facility 26 includes a control data transmit facility 31, including items 72–76 (described below with reference to FIG. 2) for forming and transmitting control data. The types of control data used depend on the channel protocol that is selected. The exemplary embodiment of the invention implements the ESCON™ protocol as specified in the "ESCON I/O Interface" document, referenced above. The invention may also be applied to systems that employ other I/O protocols.

The control data include link level control sequences, a start-of-frame (SOF) sequence, a frame header, a cyclical redundancy checksum (CRC) and an end-of-frame (EOF) sequence. The circuitry 72–76 that provides the control data is distinct from the parallel storage medium 38. The fiber interface facility 26 interleaves the transmission of control data and user defined data to form a complete data stream for transmission to the serial link driver 34. The control data are sent from host 23 to the recipient (not shown) of the frame, to allow the recipient to process the frame, and to perform handshaking functions to maintain the link between host 23 and the recipient.

The fiber interface 26 also includes a control data receive facility 29, including items 82-86 (described below with reference to FIG. 3). The control data receive facility 82-86 processes ordered sequences, SOF delimiters, frame headers, CRC and EOF delimiters that are received in the incoming data stream from the serial link driver 34.

Referring again to FIG. 1, a microprocessor 52 provides the high level control for the channel 20. The microprocessor receives channel commands from the host processor 23 and configures the fiber interface 26 to execute the channel data transfer functions. Microprocessor 52 may be, for example, an 80960CA processor manufactured by the Intel corporation. A programmable read only memory (PROM) 58 stores the instructions that are executed to boot the microprocessor. A static random access memory (SRAM) is provided for storing the microcode that configures the hardware in the fiber interface 26.

Figure 2:
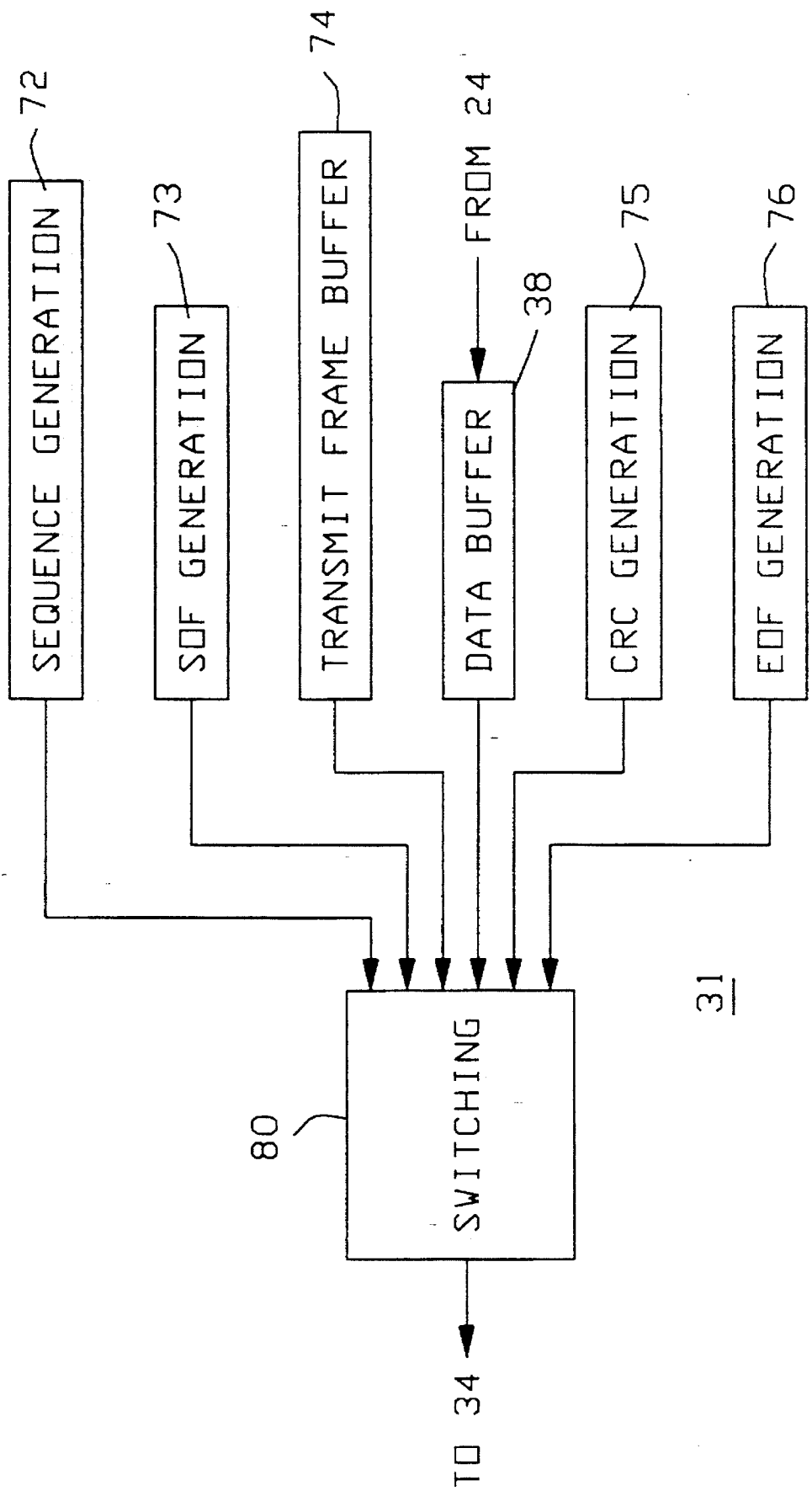
FIG. 2 is a block diagram of the channel transmit function shown in FIG. 1.

Referring now to FIG. 2, the transmit function 31 of the fiber interface facility 26 is shown in greater detail. The control data transmit facility 72–76 is distinct from the data buffer 38. Individual elements 72–76 are described in greater detail with reference to FIGS. 4–9 below. A switching mechanism 80 (described in detail below with reference to FIG. 4) is coupled, to the data buffer 38 for receiving the user defined data, and to the control data facility 72–76 for receiving the control data. The control data facility includes sequence generation logic 72 for generating link level control sequences, SOF generation logic 73, a transmit frame buffer 74 for storing a frame header, CRC generation logic 75 and EOF generation logic 76. The switching mechanism 80 is also coupled to the serial link driver 34 for providing either the user defined data or one of the sources 72–76 of control data to the serial link driver 34 at any given time.

A data path control mechanism 90 (shown in FIG. 4) configures the switching mechanism 80 to provide the sequences (e.g., idle sequence), SOF, frame header, user defined data, CRC and EOF in order, switching from the current source of data to the next source of data, when the current source of data has completed transmission. By selecting and transmitting each type of control data or user defined data at the appropriate time, the frame is formed. The switching occurs autonomously, without intervention from microprocessor 52.

In the exemplary embodiment, each function 72–76 is implemented using a respectively different dedicated hardware component, and the switching function 80 is also implemented in hardware. This architecture reduces the number of microprocessor interrupts and frees up the microprocessor 52 (shown in FIG. 1) to perform high level supervisory functions and to process exceptional conditions and errors. The functions 72–76 all operate asynchronously from the host processor 23, the parallel storage medium 24 and the data buffer 38. Each of the transmit control data functions 72–76 is tailored to perform an individual function with high speed and efficiency.

The same apparatus is used to form and transmit link control and status frames and device control and status frames, which do not include any user defined data. The format of these frames is defined in the I/O protocol definition, which is the ESCON™ I/O Interface for the exemplary embodiments. All of the same circuits are used to transmit frames that do not contain data, except that the switching facility 80 does not receive any user defined data from the data buffer 38 when transmitting a control frame. Data are only transmitted from the control data facility components 72–76.

Figure 3:
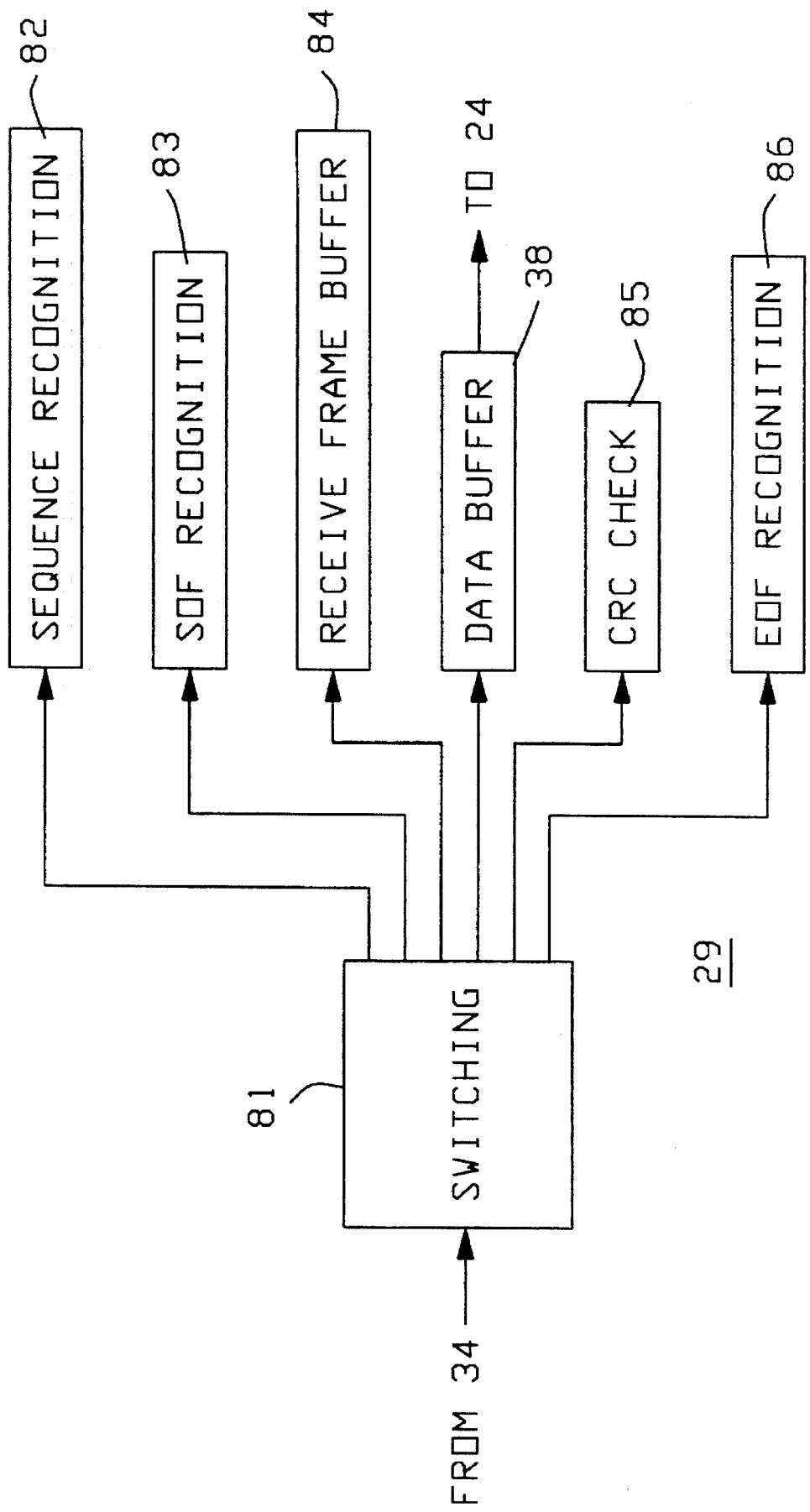
FIG. 3 is a block diagram of the channel receive function shown in FIG. 1.

FIG. 3 is a block diagram of an exemplary receive function according to the invention. The receive function is architecturally similar to the transmit function, in that respectively different elements 82–86 are provided for processing incoming control data. Items 82–86 are described in greater detail below with reference to FIGS. 10–13. Sequence recognition logic 82 processes link level ordered sequences (e.g., idles) to identify a change of the state of channel 20. An SOF recognition function 83 detects the receipt of an SOF delimiter. A receive frame buffer 84 stores an incoming frame header, so that the header may be verified. A CRC check function 85 verifies the user data within the frame. The EOF recognition function 86 identifies an EOF delimiter which indicates the end of the frame.

Receive switching facility 81 is analogous to the transmit switching facility 80. Switching facility 81 includes logic to determine when to switch the incoming data stream from one of the processing functions 82–86 to another, so that each portion of the data stream is processed correctly.

According to the invention, an expected type of frame is determined, and the data in the frame buffer 84 are compared to the expected type information, to determine whether the type of frame received is an "expected type" of frame, e.g., complying with the link and device level I/O protocols.

By providing hardware elements to generate control data and perform the switching between the user defined data and the control data, microprocessor interrupts are reduced and the microprocessor resource is freed up to direct the high level functions and respond to error conditions. Similarly, by using separate hardware elements to process received control data and to direct the switching of the control data to the hardware, efficient use is made of the microprocessor 52.

Figure 9:
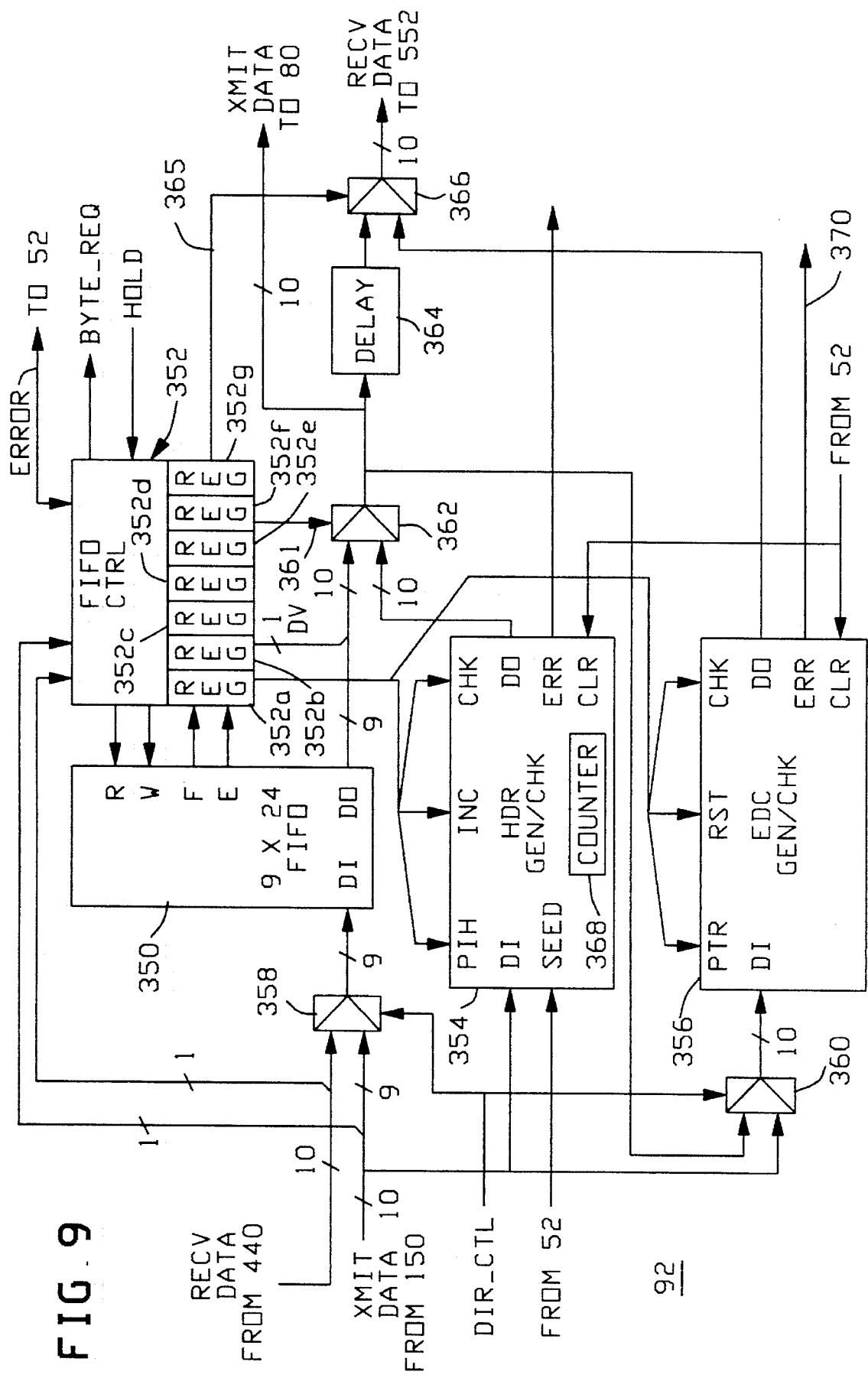
FIG. 9 is a block diagram of the FIFO & control function shown in FIG. 4.

According to another aspect of the invention, shown in FIG. 9, distinct elements 354 and 356 are provided for asynchronously forming device block header data and error detection code (EDC) data, respectively. Control elements 352, 362 and 366 inject these data into the received data stream en route to the data buffer 38 (shown in FIG. 3). In the transmit path 31, the control elements 352, 362 and 366 strip the header and EDC out of the data stream before transmission over the serial medium 36. Element 354 checks the block header and element 356 checks EDC data.

THE EXEMPLARY EMBODIMENTS

FIBER INTERFACE TRANSMIT FUNCTIONS

Figure 4:
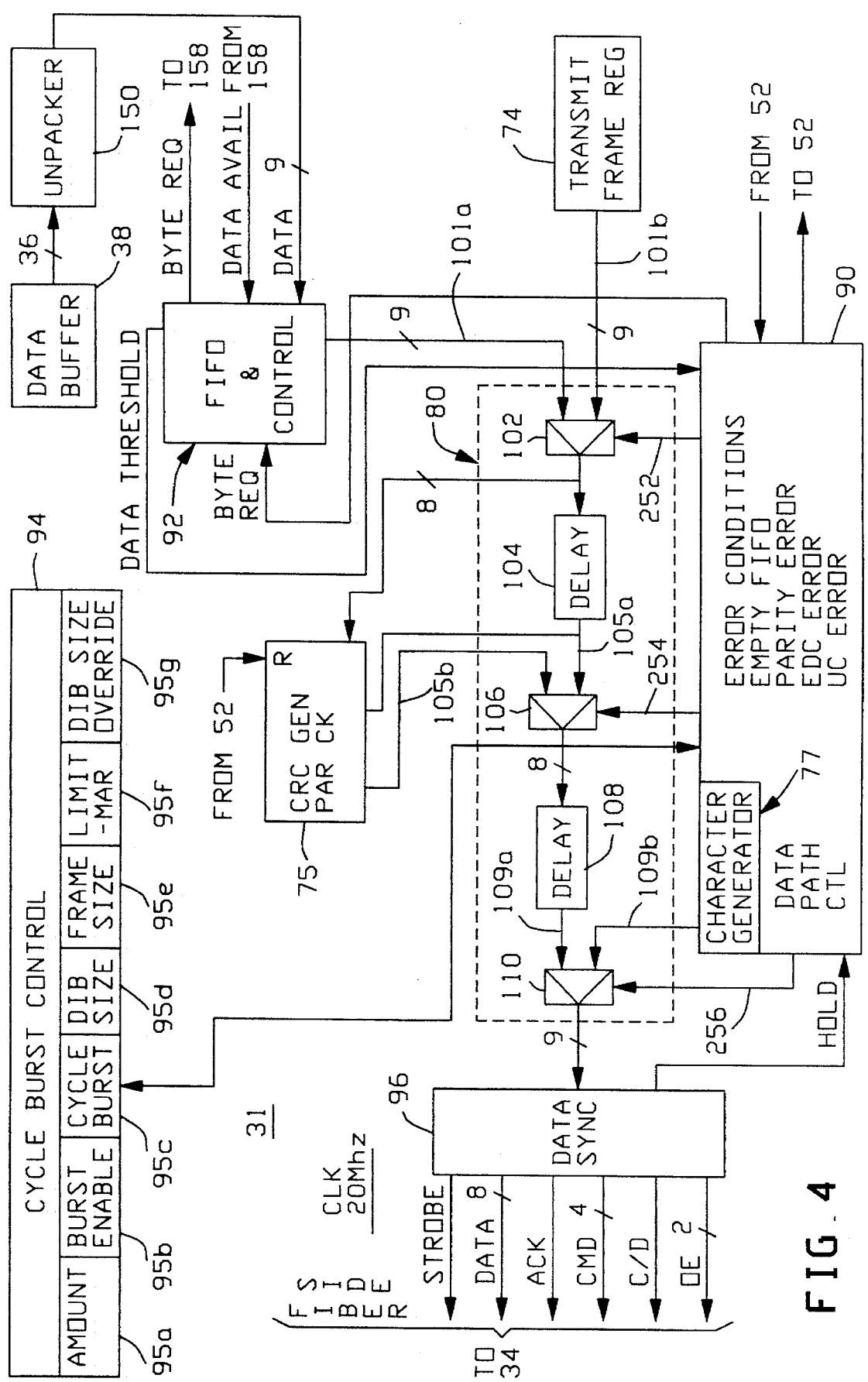
FIG. 4 is a detailed block diagram of the transmit function shown in FIG. 2.
Figure 7:
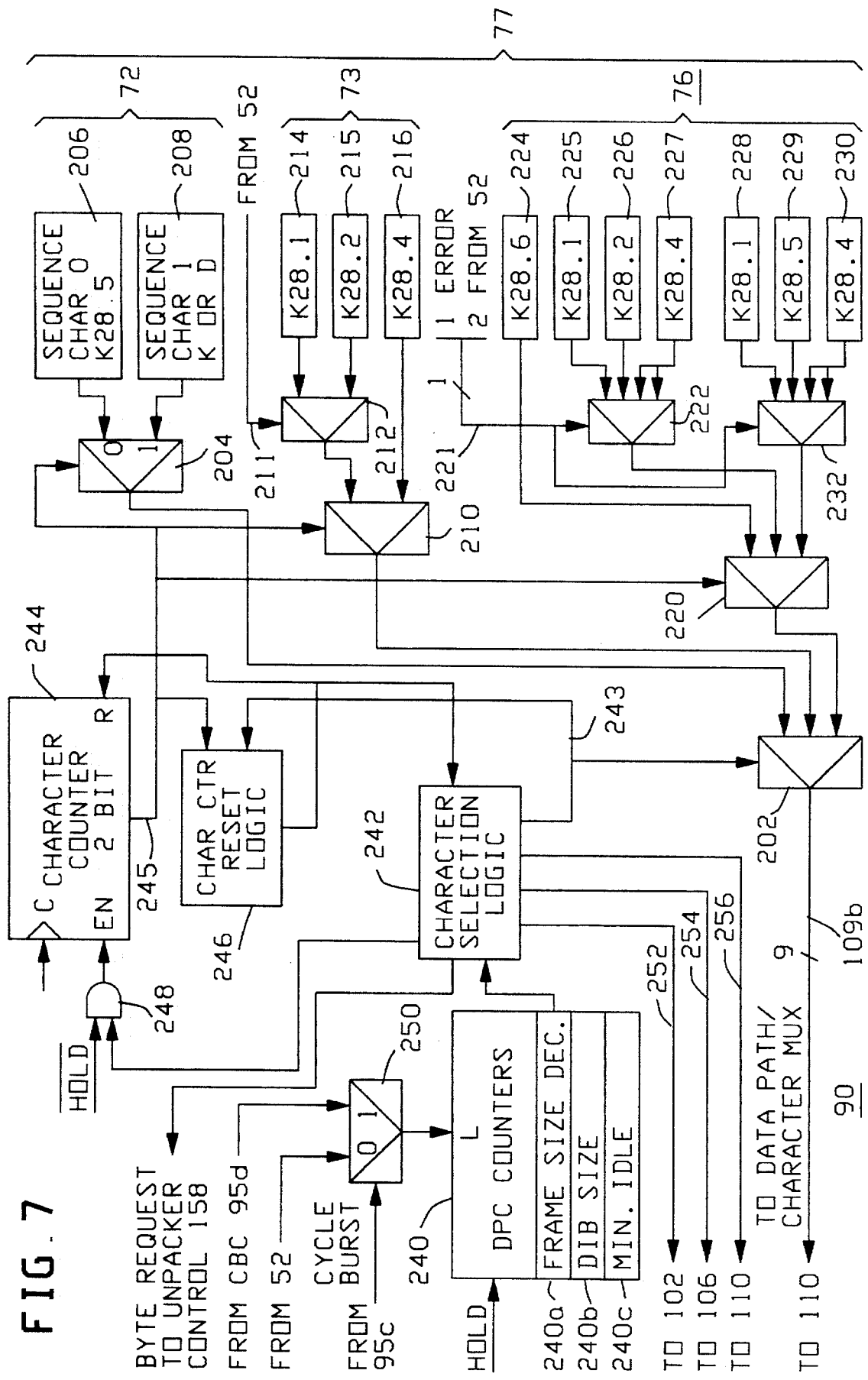
FIG. 7 is a block diagram of the data path control logic shown in FIG. 4.

FIG. 4 is a block diagram of the transmit logic partition 31 of the fiber interface circuitry 26. The transmit logic 31 includes the transmit data path control 90 (described below with reference to FIG. 7), switching circuitry 80, the Cycle Burst Control circuitry 94, CRC generation and parity check circuitry 75, character generators 77 (including sequence generation 72, SOF generation logic 73 and EOF generation logic as shown in FIGS. 2 and 7), and the output synchronizer 96. Each of these functions is explained in greater detail below.

The switching facility 80 receives the control data and user defined data from the sources 38 and 72–76 shown in FIG. 2. As shown in FIG. 4, switching facility 80 includes a plurality of multiplexers 102, 106 and 110.

Multiplexer 110 selects either ordinary character (frame) data 109a, or special character data 109b. Transmission frames include ordinary character data 109a, which comprises a header, a devise information block or DIB (for device frames) and a cyclical redundancy checksum (CRC). The special character data 109b include ordered sequences that are transmitted while establishing the link, and idle characters that occur to maintain synchronization in between frames after the link is established. The special character data 109b also include the start-of-frame (SOF) delimiter and the end-of-frame (EOF) delimiter. Data path control 90 controls multiplexer 110 to select the special character path 109b from the character generator function 77 to transmit idle characters until an SOF is sent. Then data path control 90 signals multiplexer 110 to select path 109a.

Multiplexer 102 has respective input terminals for receiving user defined data, via line 101a, from the First-in, First-Out (FIFO) & Control function 92, or for receiving header data, via line 101b from the transmit frame register 74. After the SOF has been selected for transmission, data path control 90 controls multiplexer 102 to select line 101b to transmit the header from the transmit frame register 74 (The transmit frame register 74 is described below with reference to FIG. 6A). When header transmission is completed, data path control 90 signals multiplexer 102 to select line 101a, to transmit the user defined data from the FIFO & Control function 92. The FIFO & Control function 92 receives the user defined data from the data buffer 38 via the unpacker 150 (described below with reference to FIG. 5).

The FIFO & Control function 92 provides an intermediate storage medium (FIFO buffer 350, shown in FIG. 9) into which the user defined data are stored before transmission. In some cases (discussed below with reference to FIG. 9) the data buffer 38 and unpacker 150 may contain additional data besides the user defined data, the additional data including (but not limited to) error detection code (EDC) data. The EDC data are removed from the data stream by the FIFO & control 92, and only the user defined data are stored in the FIFO buffer 350, so that a continuous stream of user defined data is available in the FIFO & control 92 for transmission over the serial data transfer medium 36. The structure and purpose of the FIFO & control 92 is described in detail below with reference to FIG. 9.

Referring again to FIG. 4, while the header and user defined data are being transmitted, they are also provided to the CRC generation function 75, which computes the CRC over the header and the user defined data, using a byte wise CRC generation technique. In the exemplary embodiment, the CRC is computed using the polynomial specified in the ESCON I/O Specification at pages 2–9 and 2–10. One skilled in the art could readily construct a CRC generator using that polynomial. The header and user defined data are passed through a delay function 104. The delay allows CRC function 75 to compute the CRC for transmission immediately after the last bit of user defined data. The delayed header and user defined data are provided to multiplexer 106 via line 105a. While the header and user defined data are being transmitted, data path control 90 controls the multiplexer 106 to transmit the byte stream it receives via line 105a. After the last bit of user defined data is transmitted, data path control 90 signals the multiplexer 106 to select line 105b for transmission. The CRC data are provided to multiplexer 106 via line 105b.

The output byte stream from multiplexer 106 passes through a delay element 108. The delayed byte stream is then provided to line 109a. After the last bit of the CRC is transmitted, data path control 90 signals multiplexer 110 to select line 109b. Character generator 77 provides an EOF delimiter and then resumes sending idle characters over line 109b.

In addition to the circuits shown in FIG. 4, the exemplary switching facility also includes circuitry (not shown in FIG. 4) for selecting one of the plurality of special characters provided by the character generator 77. This circuitry is described below with reference to FIG. 7.

In FIG. 4, the Cycle Burst Control logic 94 includes a plurality of registers 95a–95g, the contents of which are provided to data path control 90. The Cycle Burst Control also includes logic that determines whether to start another frame. This logic compares the values in the amount register 95a and the (LIMIT-MAR) register 95f.

The amount register 95a is loaded, under control of microcode (executed in microprocessor 52), with a value that represents the amount of data that must be present in the data buffer 38 at the start of frame transmission to guarantee an uninterrupted frame. If data buffer 38 is coupled to a host processor 23, the value stored in the amount register 95a is the size of the device information block (DIB). Alternatively, if the data buffer 38 is installed in a device controller 37 (FIG. 14), the value stored in the amount register 95a may also include control data, such as a device header and error detection code (EDC) that are stripped from a data block upon receipt from the mass storage device 39 (FIG. 14). Header/EDC stripping are described in greater detail below with reference to FIG. 9.

Figure 8:
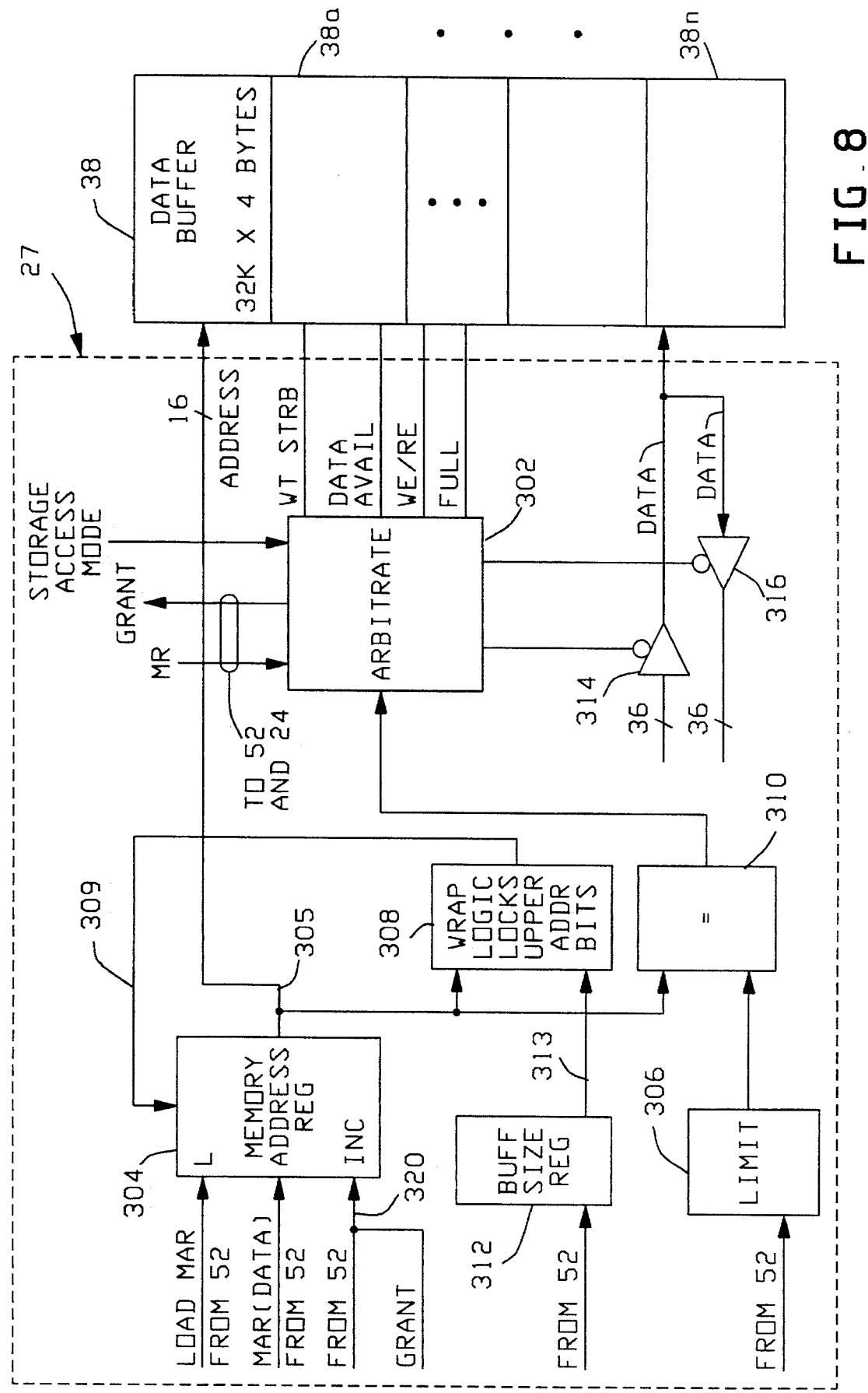
FIG. 8 is a block diagram of the DMA logic shown in FIG. 1.

Referring again to FIG. 4, the LIMIT-MAR (Memory Address Register) register 95f is loaded with a LIMIT-MAR value computed from the LIMIT and MAR in the DMA address control circuitry (shown in FIG. 8). When the data buffer 38 is read, the LIMIT value represents last byte requested and written in buffer 38, and the MAR value represents the address last read. Thus (LIMIT-MAR) is the amount of data remaining in the data buffer 38 for transmission within the frame. If the value in the LIMIT-MAR register 95f is greater than or equal to the value in the amount register 95a, the condition for automatically sending another frame is met.

Burst Enable register 95b is set to place the hardware in a state which allows a frame to be sent if the conditions for automatically sending the frame are met. If Burst Enable 95b is set and DIB override register 95g is not set, then a frame will be sent if the amount register is less than or equal to the value of LIMIT-MAR (Memory Address Register). LIMIT-MAR represents the amount of data available in data buffer 38 for transmission, and is described below with reference to FIG. 8.

Cycled Burst Mode register 95c is set to operate the data path control 90 in Cycled Burst Mode. In Cycled Burst Mode, the data path control 90 and switching facility 80 automatically alternate the transmission of control data and user defined data to form frames for transmission (This alternating is asynchronous with the activities of microprocessor 52).

The DIB size register 95d is loaded by microcode (executed in microprocessor 52) with a standard DIB size value identifying the amount of user defined data to be included in each frame while operating in Cycled Burst Mode. The value in the DIB size register 95d is automatically loaded into the Frame Size decrementer 240a (shown in FIG. 7) within the data path control 90, while the system is operating in Cycled Burst Mode.

The frame size value register 95e specifies how much of the frame is sent from the frame register 74. When in Cycled Burst Mode the frame register 74 contains only the frame header and the frame size value register 95e is set to the size of the header.

If the DIB size override flag in register 95g is set, the transmission of a frame is forced, whether or not the automatic send condition is met (i.e., regardless of whether the amount of data available in the data buffer 38 is as great as the value stored in the LIMIT-MAR register 95f.

The data sync function 96 provides the input signals to the TAXichip set 34 for transmitting the serial data stream over the fiber 36. Data sync 96 includes a 20 Megahertz crystal oscillator clock signal (CLK) for the TAXichip set 34. The STROBE signal is timed so that the positive going edge of the STROBE signal indicates that the data and command (CMD) signals are to be latched by the TAXichip. The command/data select (C/D) signal conditions the TAXichip to encode and transmit either the data stream transmitted by multiplexer 110 or a command stream (not shown). The command input signal is used to transmit the special characters ("K" characters). The output enable (OE) line signals to the TAXichip 34 to enable either or both of a pair of differential output lines or a single ended output line. One skilled in the art of designing digital signal communication circuitry could readily construct the data sync function to perform frequency matching.

UNPACKER (SERIALIZER)

Figure 5:
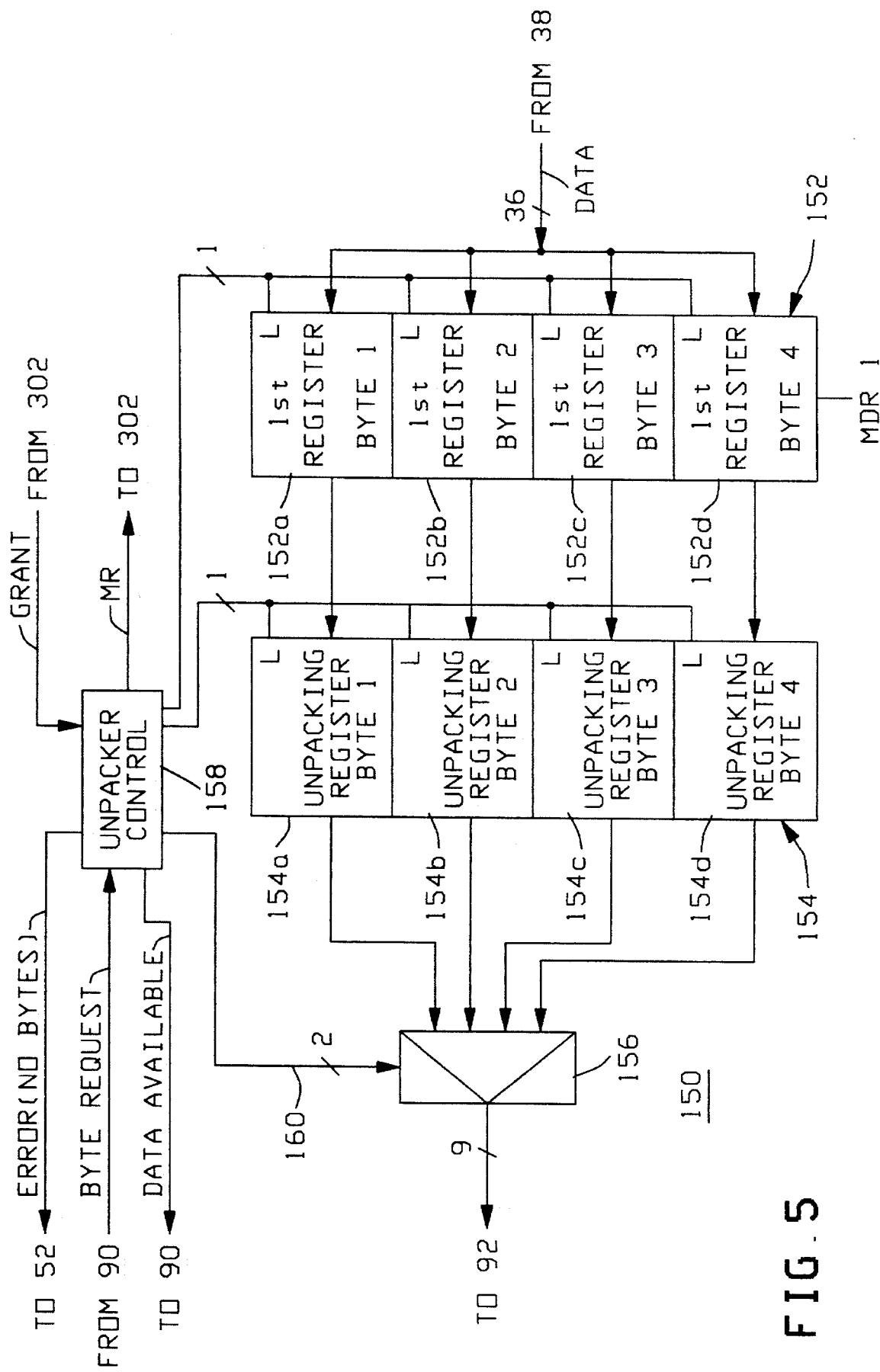
FIG. 5 is a block diagram of the unpacker shown in FIG. 4.

FIG. 5 is a block diagram of the unpacker logic partition 150 including the unpacking registers 152 and 154 and unpacker control circuitry 158. Data are read from the data buffer 38 (FIG. 1) and stored in the unpacker 150. The data are transmitted from the unpacker 150 to the FIFO & control 92 (shown in FIG. 9). The unpacker logic 150 converts the four-byte parallel stream from data buffer 38 into a one byte stream.

Referring to FIG. 5, the unpacking registers 152 and 154 are two 36 bit registers, controlled by the unpacker control circuitry 158. The first register 152 is loaded with four bytes of data from the data buffer 38 under control of the unpacker control 158. The Unpacker control circuitry 158 transmits a memory request (MR) to the arbitrate logic 302 (shown in FIG. 8). In the exemplary embodiment, the same data buffer 38 is used both for transmit and receive functions, and the arbitrate logic 302 allocates data buffer 38 accesses between the host bus and either one of the transmit 31 or receive 29 functions. The first register 152 is loaded when the unpacker control circuitry 158 receives a grant signal from the arbitrate logic 302. This signal is received in response to the memory request signal sent by unpacker logic 158. The other conditions for loading register 152 are that the device read direction is set and burst is enabled in the Burst Enable register 95b of the Cycle Burst Control circuitry 94 (shown in FIG. 4).

The second register 154 is the unpacking register, which loads the data from the first register 152, on the clock following the loading of register 152 (if the unpacking register 154 is empty). The unpacker control circuitry 158 includes a 2 bit counter (not shown) to provide a multiplexer select signal 160 to a multiplexer 156. Multiplexer 156 receives the data output by the unpacking register 154. Multiplexer 156 rotates through, transmitting the signal 160 to select each of the four bytes 154a–154b in the unpacking register 154 successively. Each byte of data is then sent from multiplexer 156 to the FIFO & Control 92 (shown in FIG. 9).

Figure 6A:
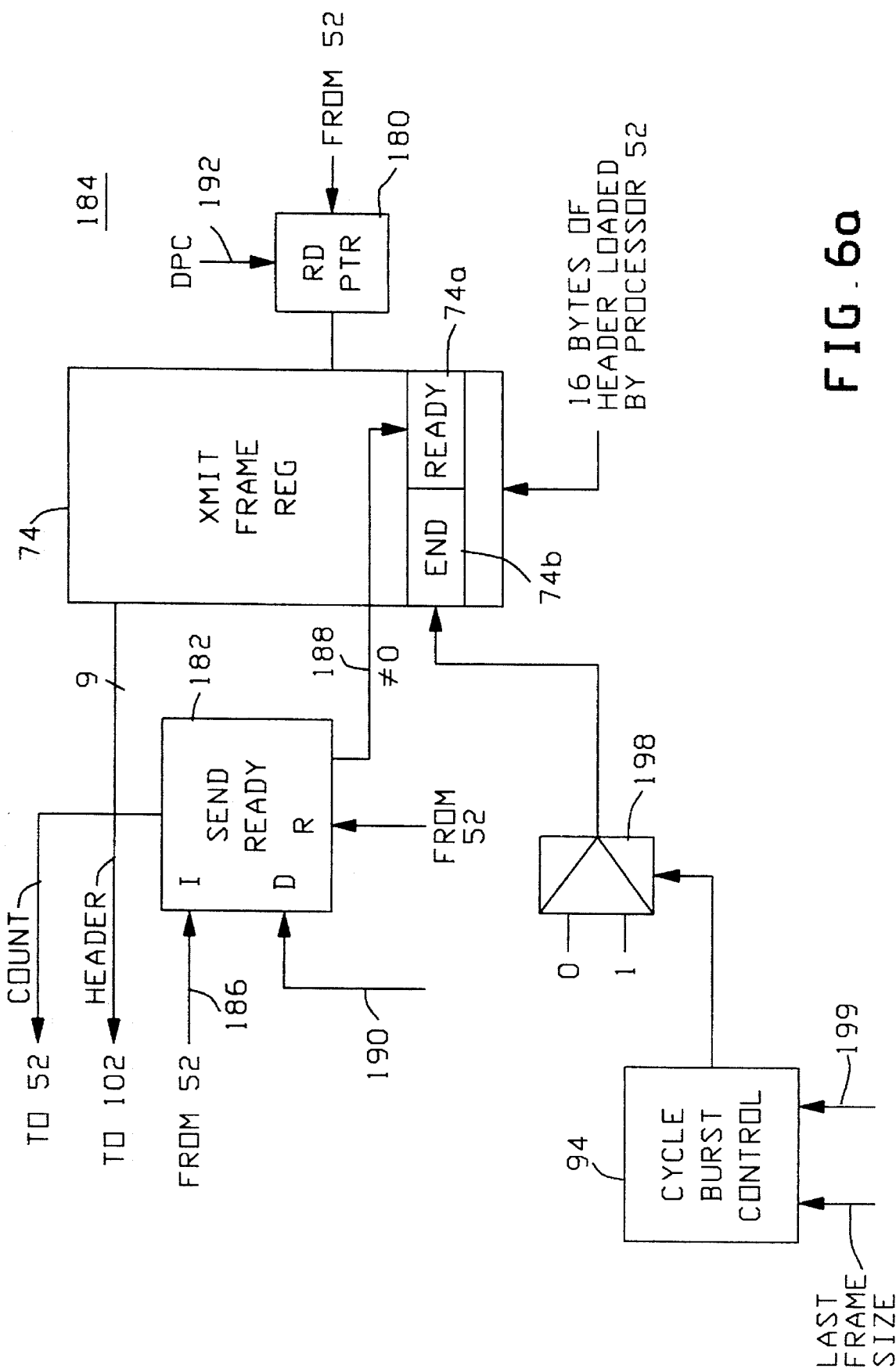
FIG. 6a is a block diagram of the transmit frame register logic shown in FIG. 4.

A prefill operation is performed for this pipeline to load the first four bytes of data into the unpacking register 154. This prefill operation occurs while the header is being sent from the transmit frame register 74 (FIG. 6A).

Referring again to FIG. 5, when the unpacking register 154 is loaded with four bytes of data, the unpacker control circuitry 158 transmits a "data available" signal to the data path control circuitry 90 (FIG. 4). Even though the user defined data are not the first data in the frame—the SOF is first—data path control circuitry 90 (FIG. 4) does not begin transmitting the SOF until the first four bytes of data have been loaded into the unpacking register 154. This ensures that user defined data are available once the frame transmission is begun by transmitting the SOF. Consequently, there is no interruption in the transmission of data until after the EOF is sent.

Referring again to FIG. 5, when the data path control 90 (shown in FIG. 7) receives the data available signal, it configures the switching facility 80 to begin the transmission of a frame. After the four bytes in the unpacking register 154 are transmitted, data path control 90 transmits a "byte request" signal to the unpacker control 158. This signal indicates to the unpacking logic that the unpacking register 154 is ready to receive the next four bytes, which are then loaded on the next clock cycle into register 154 from register 152. Then another four bytes of data are transferred from the data buffer 38 (FIG. 1) to register 152.

If an error occurs, such that the unpacker is unable to deliver a steady stream of bytes, then unpacker control 158 transmits an "error" signal to data path control 90. Depending on the timing of the error, data path control may take different actions. If, for example, the SOF, header and user defined data are already being transmitted, data path control 90 may configure the character generator 77 to transmit an end of frame—abort (AEOF) sequence.

It is understood by one skilled in the art that the packer may be implemented with registers 152 and 154 having different capacities if the byte stream coming from the data buffer 38 is more or less than 36 bits wide.

TRANSMIT FRAME REGISTER

FIG. 6A shows exemplary transmit frame register logic 184. This logic includes the frame register 74, a send-ready counter 182 and a read pointer 180.

The transmit frame logic 184 performs three main operations:

(1) it receives frame header data from microprocessor 52, stores the header data in a transmit frame register 74, and transmits frame headers for both data frames and control frames;

(2) it modifies the data stored in the frame register 74 to provide control information to the recipient of the frame; and (3) it provides a source of header data that is independent and distinct from the source (data buffer 38) of user defined data, so that a control frame may be transmitted by the channel 20 (FIG. 1), even when the channel 20 is unable to provide user defined data to form a data frame.

The frame register 74 is a 16 byte register which holds header information or an entire small control frame (i.e., a frame that does not include any user defined data). If the entire frame is contained in the Frame register then the DIB size value register 95d in the Cycle Burst Control 94 (shown in FIG. 4) contains a value of zero, and the DIB Override flag 95g (shown in FIG. 4) is set to force the transmission of the control frame without checking whether there are sufficient user defined data (none is needed) in the data buffer 38 (FIG. 1). When in Cycled Burst Mode, the frame register 74 contains only the frame header, and the frame size value register 95e (shown in FIG. 4) is set to the size of the header.

The frame register read pointer 180 points to the next byte to be sent from the frame register, it is loaded by microprocessor 52 and cleared by the Cycle Burst Control 94 when the Cycle Burst Control determines that it is time to send an EOF (so the transmit frame register 74 may be used to send the next frame) when in Cycled Burst Mode. In Cycled Burst Mode, the frame starts in byte 0 of the frame register 74. When the read pointer 180 reaches the value stored in the frame size value register 95e (shown in FIG. 4), the data path control 90 switches multiplexer 102 to select the data stream from the unpacker 150 (shown in FIG. 5) until a number of bytes specified in the frame size decrementer counter 240a (shown in FIG. 7) have been transmitted. Data path control 90 also transmits a signal 192 to the read pointer 180 to clear the read pointer, so that the register contents may be read again when transmitting the next frame.

The first function of the transmit frame logic 184 has already been described in detail. The second function of logic 184 (modifying the control data) enables logic 184 to send "readies" (frames in which the ready bit 74a is set). As defined in chapter 6 of the ESCON I/O Interface specification referenced above, the header of every device frame (i.e., frame associated with the execution of an I/O operation) includes several bits of information that are defined by the source and destination, and by the nature of the information exchange. This information is generally the same for every frame sent during a single I/O operation. Generally, once the microprocessor 52 loads the header data into the transmit frame register 74, the same header data are sent from the register 74 for each frame within the same I/O operation. One bit in the header, the ready bit 74a, is used for pacing and changes dynamically between frames, even within the same I/O operation.

The ready bit 74a, when set to one, indicates that the channel 20 (FIG. 1) which is sending data is ready to accept a new data request from the recipient (not shown) of the data. For example, the channel 20 may be transmitting the first 10 kilobytes of data (in an I/O operation that includes 50 kilobytes) in response to an I/O request from the recipient for the first 10 kilobytes. The recipient of the data only requests as much data as it can accept, which depends on the availability of buffer space within the recipient. When the recipient is ready to accept more data, it sends another request to the sender, channel 20. When channel 20 has processed the request (described in detail with reference to the receive functions of channel 20 in FIGS. 10–12), it sets the value of the ready bit 74a to "one" in the header of the next frame that is transmitted. Thus the sender of data sends "readies" to the recipient for pacing the data requests. The method for setting the ready bit 74a is now described.

When a request has been processed, and the information therefrom is transmitted to the microprocessor 52 (FIG. 1), the channel 20 is ready to receive another request. The send ready counter 182 tracks the transmission of readies. The Send Ready counter 182 is a 4 bit counter which is incremented and cleared by microprocessor 52 and decremented by hardware (i.e., by a signal from data path control circuitry 90 which indicates that the frame has been sent). Microprocessor 52 sends an increment pulse signal 186 to the send ready counter 182 to increment the value held by the send ready counter 182. The send ready counter 182 provides an output signal 188 to the transmit frame register 74. The value of signal 188 is set to "one" if the count in send ready counter 182 is greater than zero, and is reset to "zero" if the count is equal to zero. When the signal 188 is set to "one", the ready bit 74a stored in the transmit frame register 74 is set to "one." The header in the next frame transmitted has its ready bit set to "one." After the next frame is sent the data path control 90 provides a "sent frame" signal 190 to decrement the value held by the send ready counter 182.

When enough "readies" have been sent to decrement the ready counter 182 to "zero", the value of the output signal 188 of counter 182 is reset to "zero." Subsequent frame headers will have their ready bits set to "zero" until the microprocessor 52 sends another increment pulse 186 to the send ready counter 182.

Thus, the transmit frame logic 184 relieves the microprocessor of the task of tracking how many readies are to be sent, and in which frames the ready bit is set. The microprocessor 52 need only identify, via the increment pulse 186, that a request has been processed and a ready can be sent by the transmit frame logic 184. The ready is sent asynchronously from the increment pulse 186. If a frame is being transmitted when the microprocessor 52 completes the processing of a request, the microprocessor need not wait until the current frame has completed transmission before sending an increment pulse 186 to the send ready counter 182. The increment pulse 186 may even be sent while a header is being transmitted from the transmit frame register 74. Whenever the next header is transmitted from transmit frame register 74, the ready is sent, with no intervention by the microprocessor 52.

Although the exemplary embodiments use the transmit frame logic to modify the ready bit used in the ESCON™ protocol, it will be understood by one skilled in the art that this method and structure may be applied in other I/O protocols to change a variety of control data asynchronous with any processing performed by the microprocessor 52. A frame register 74 and send ready counter 182 may be used to turn on a bit asynchronously to the generation of frames, with assurance that the set bit is transmitted in one and only one frame. The bit may be applied by the recipient as an instruction to initiate another process that is asynchronous to the I/O operation.

The described circuitry also allows the system to turn on the bit for a dynamically selected number of frames as the microprocessor issues multiple increment pulses 186 before the counter 182 is decremented to zero.

Referring now to FIG. 6b, another variation of the transmit frame logic 185 is shown. Elements that are the same as in logic 184 of FIG. 6a have the same reference numerals. Two transmit frame registers 194a and 194b are included in logic 185. Each of these registers is coupled to a respective input port of a multiplexer 196. The output signal from the send ready counter 182 is provided to the input select terminal of the multiplexer 196, instead of to the transmit frame register. The output signal from the multiplexer 196 is transmitted to multiplexer 102 (shown in FIG. 4) as the frame header. In the embodiment of FIG. 6b, When the output signal 188 of the send ready counter 182 has a value of "zero" the header signal output from the multiplexer 196 is taken from the first transmit frame register 194a to provide a first header. But if the send ready counter 182 is incremented and the output signal 188 has a value of "one", then an alternate header is taken from register 194b. It is understood by one skilled in the art that this method may be used to substitute an entirely different header, or to change any subset of the frame header data stored in the transmit frame register 194a for use in a single frame.

A bit 74b is varied based on the state of the Cycle Burst Control logic 94. Cycle Burst Control logic 94 (shown in FIG. 4) monitors the LIMIT-MAR amount in register 95f (also shown in FIG. 4). When all of the user defined data in a data transfer have been loaded into the data buffer 38, a bit 199 is set in Cycle Burst Control 94 by microprocessor 52. Once bit 199 is set, when the value of the LIMIT-MAR register 95f becomes less than or equal to the value in the DIB size register 95d, the last frame is being transmitted using a register (a "last frame" register, not shown) to determine its length. Cycle Burst Control 94 changes the select signal sent to multiplexer 198, changing an END bit 74b in the transmit frame register 74. This bit tells the recipient that this is the last frame of a data transfer.

The third function of the transmit frame logic 184 described above (an independent and distinct source of frame header data), provides the ability to maintain a full-duplex exchange of control information between the channel 20 and a device or controller coupled to the channel via the serial data transfer medium 36. This full-duplex control data exchange may be maintained, even if only half-duplex exchange is possible for user defined data. For example, in the ESCON™ I/O Interface protocol which is followed in the exemplary embodiment, full-duplex control and half-duplex data exchange are specified.

Because the protocol only requires half-duplex data I/O, a single buffer 38 (FIG. 1) is used in the exemplary embodiment for both the transmit and receive functions of the channel 20. Using a single data buffer 38, it would not be possible to extract frame header data from the buffer 38 at the same time that the receive path of the channel 20 is transmitting received data to the host 23 (FIG. 1). Nor would it be possible to extract the frame header data while the host interface 24 or the microprocessor 52 (both shown in FIG. 1) has access to the data buffer 38. This problem is mitigated in the subject invention by using a distinct frame register 74 to form a control frame using the transmit frame register, the CRC generator 75 and the character generator 77 (all shown in FIG. 4). This may be done without gaining access to the data buffer 38.

TRANSMIT DATA PATH CONTROL

FIG. 7 is a block diagram of the data path control function 90. Data path control 90 (DPC) includes a plurality of registers and counters for controlling the selection of one of several sources of user defined data or control data for transmission over the serial transfer link 36.

As described above with reference to FIG. 4, the character generator 77 comprises a sequence generator 72, an SOF generator 73 and an EOF generator 76. FIG. 7 shows an exemplary embodiment of the character generator 77 in which the special character bit sequences (i.e., those designated K28.n, where n=1, 2 or 4–7) are hardwired into the DPC logic 90. In the exemplary embodiment, each character is stored in a respectively different register. The standard bit patterns that form the idle character and the SOF and EOF delimiters are set forth in Appendix B of the ESCON™ I/O Interface specification, referenced above.

Only the second character 208 of the sequence functions 72 (which may be a data character) may take on multiple values in the exemplary embodiment. It is understood by one skilled in the art that a distinct valid data character generator may also be provided for each of the valid data characters used, similar to the technique used in the special characters.

Character selection logic 242 provides a signal 243 to the input select terminal of multiplexer 202. If the value of signal 243 is zero, then a sequence function from multiplexer 204 is transmitted from the output terminal of multiplexer 202. If the value of signal 243 is one, then an SOF delimiter is transmitted from multiplexer 210. If the value of signal 243 is two, then an EOF delimiter is transmitted from multiplexer 220.

In between bursts (frames) the sequence function register is selected. The idle character is defined as the K28.5 character, transmitted a minimum number of times. The minimum idle register 240c specifies the minimum number of pairs of idle characters to be sent while in Cycled Burst Mode. The minimum idle register 240c is loaded by microprocessor 52 (FIG. 1). The idle character is provided by block 206, when multiplexer 202 is set to select the input from multiplexer 204, and multiplexer 204 repeatedly selects the K28.5 character from block 206.

A frame starts when the SOF characters are selected. SOF ordered sets comprise two special characters. The SOF ordered set is formed if the character selection logic 242 signals multiplexer 202 to select the data received from multiplexer 210. Multiplexer 210 transmits a first character from the output terminal of multiplexer 212, followed by a K28.7 character from block 216. The first character selected by multiplexer 212 may either be a K28.1 for a CSOF (connect SOF), or a K28.5 for an PSOF (Passive SOF). The microprocessor 52 (shown in FIG. 1) loads a PSOF register (not shown). The value in the PSOF register is loaded via input signal 211 to the input select terminal of multiplexer 212 to select a CSOF or PSOF, as appropriate.

After the SOF characters, DPC 90 transmits a signal 252 to the input select terminal of multiplexer 102 (shown in FIG. 4) to select the control data from the transmit frame register 74. The amount of data transmitted from frame register 74 is the number of bytes specified in the frame register size value (e.g., 16 bytes in the exemplary embodiment).

When the frame register 74 has transmitted the entire header, the character selection logic 242 of DPC 90 transmits signal 254 to the input select terminal of multiplexer 106 (shown in FIG. 4) to select the user defined data from the FIFO & Control 92. The number of bytes of user defined data to be transmitted in the frame is loaded into the frame size decrementer 240a. In the exemplary embodiment, in Cycled Burst Mode, the DIB size in register 95d of the Cycle Burst Control circuitry (shown in FIG. 4) is loaded into the frame size decrementer 240a as the initial value. The frame size decrementer 240a counts down from its initial value to zero to identify when to start sending the EOF delimiter. If the frame is not a data frame, the entire frame is in the frame register 74, and the frame size decrementer 240a is initialized to 0.

When the frame size decrementer 240a counts down to zero, the transmission of user defined data in the frame is completed. Character selection logic 242 then sends signal 256 to multiplexer 110 to select the character path 109b, and the EOF characters are selected. EOF ordered sets comprise three special characters. The EOF character may either be an PEOF (passive), DEOF (disconnect), or AEOF (abort). An EOF character is selected if the character selection logic 242 signals multiplexer 202 to select the data received from multiplexer 220. Multiplexer 220 first transmits a K28.6 character from block 224, then a second character from the output terminal of multiplexer 222 and a third character from the output terminal of multiplexer 232.

Multiplexers 222 and 232 and the blocks 225–230 that transmit characters to them are so configured that the same input select signal 221 may be applied to both multiplexers 222 and 232 to generate valid EOF ordered sets as defined in Appendix B of the ESCON I/O specification. Thus, the input select signal 221 sent to each multiplexer 222, 232 is set to zero to select a K28.1 for the second character and a K28.1 for the third character, to form a DEOF. The input select signal 221 is set to one to select a K28.2 for the second character and a K28.5 for the third character, to form a PEOF. And the input select signal is set to two to select a K28.4 for the second character and a K28.4 for the third character, to form an AEOF.

Prior to setting Burst Enable, the microprocessor 52 sets a PEOF bit in a register (not shown), if an EOF Passive is to be sent. The value of the PEOF bit is provided in the first bit of signal 221 to the input select terminal of multiplexers 222 and 232. If the frame does not have an error, and the PEOF bit has a value of zero, an EOF Disconnect (DEOF) is sent. If the hardware detects an Empty FIFO 92, sequence change, parity error or error detection code (EDC) error (EDC is described below with reference to FIG. 9), DPC 90 selects the EOF abort character by setting the value in another register (not shown) to one. The value in that register is transmitted to the input select terminal of multiplexers 222 and 232 via the second bit of signal 221. If the second bit of signal 221 has a value of one, an EOF abort delimiter (AEOF) is transmitted to force the end of a burst.

The character counter 244 is a 2 bit counter which controls the sending of sequence characters and SOF/EOF Delimiters. The count in character counter 244 is provided via signal 245 to the input select terminals of multiplexers 204, 210 and 220. Each time the output signal 245 of the character counter 244 is incremented, another special character is transmitted from the respective multiplexer 204, 210 or 220, the output signal of which is selected by multiplexer 202 for transmission.

The character counter reset logic 246 controls how high the character counter 244 may count before it is reset at the completion of transmitting a character. The reset logic 246 receives the count signal 245 from the character counter 244. Reset logic 246 also receives the signal 243 from character selection logic 242 identifying the character or delimiter being transmitted. If idle characters are being transmitted, multiple idles are sent and the reset logic 246 sends a reset signal 247 to the character counter after each K28.5 character. If an SOF is being transmitted, the reset logic 246 sends a reset signal 247 after the character counter reaches 1 (i.e., 2 counts). If an EOF is being transmitted, the reset logic 246 sends a reset signal 247 after the character counter reaches 2 (i.e., 3 counts). The reset logic 246 also transmits the reset signal 247 to the character selection logic, indicating that the character or delimiter is completed.

The frame size decrementer 240a can also be loaded directly by microprocessor 52 to send a frame in non-Cycled Burst Mode if the Cycled Burst Mode is turned off in Cycle Burst Control 94. Cycled Burst Mode is turned off by resetting the value in the Cycled Burst Mode register 95c (shown in FIG. 4). The value in register 95c is applied to the input select terminal of multiplexer 250 to select the initial value for the frame size decrementer, from the microprocessor 52. The frame size decrementer 240a counts bytes from the memory data path only.

Microprocessor 52 may assert the DIB Override by setting the DIB Override value in CBC register 95g to start burst mode data transfer. The DIB Override forces the transmission of a frame regardless of whether the automatic send condition (i.e., sufficient user defined data in the data buffer 38 shown in FIG. 1) is met. If the Burst Enable value in register 95b (FIG. 4) is set, the hardware is set to a state to allow a frame to be sent if the conditions needed are met. If DIB Override is not set then a frame will be sent if the amount register 95a is less than or equal to the value of LIMIT-MAR (Memory Address Register) 95f.

A HOLD signal may be applied to DPC counters 240 by the serial link driver 34. In response to the HOLD signal, the frame size decrementer 240a in DPC counters 240 is not decremented on the next clock cycle. This accommodates differences in the clock used by the DPC counters 240 and the clock within the serial link driver 34. If the clock in the DPC counters 240 run slightly faster than the clock in the serial link driver 34, then periodically, the serial link driver sends a HOLD signal so that no byte is transferred for one clock period, allowing the serial link driver 34 to catch up with the data loaded in the transmit pipeline. The HOLD signal is propagated throughout the transmit logic 31 (shown in FIG. 4), including the character generator 77, the CRC generator 75, the transmit frame register 74 and the FIFO & control 92.

DATA BUFFER DMA CONTROL

FIG. 8 is a block diagram of the DMA logic 27 that controls access to the data buffer 38. The DMA address control logic 27 includes the memory address register 304, the buffer size register 312, the LIMIT register 306 and the memory request arbitrate logic 302.

The memory address register 304 (MAR) is loaded by microprocessor 52 (shown in FIG. 1). The MAR 304 is incremented by the memory GRANT pulse 320 from the arbitrate logic 302. The output signal 305 from the MAR 304 is transmitted to the data buffer 38, to the wrap logic 308 and to the limit address comparator 310. The output signal 305 from the MAR 304 determines the location in the data buffer 38 into which the next datum is written, or from which the next datum is read.

The buffer size register 312 is loaded by microprocessor 52 (shown in FIG. 1). Buffer size register 312 specifies (as a power of two) the size of a buffer area 38a that is allocated within data buffer 38. There may be many buffer areas 38a–38n allocated simultaneously for respective I/O operations. Each buffer area 38a–38n functions as a circular queue. The output signal 313 of buffer size register 312 is transmitted to the wrap logic 308.

The initial load of an address into the MAR 304 by microprocessor 52 addresses a particular buffer area 38a. The wrap logic 308 provides a signal 309 to the MAR 304 that locks the upper address bits in the MAR 304. An increment of the MAR 304 only affects the unlocked (lower) bits of the address in the MAR 304, causing a wrap back to the beginning of the buffer area 38a when each respective unlocked bit in the MAR has a value of one.

For example, if the value in buffer size register 312 is 4, all address bits except the two least significant bits are locked in the wrap logic 308, and if the initial value loaded into the MAR 304 by microprocessor 52 is 16 (10000 in binary) then the increment pulse 320 causes the addresses in the MAR 304 to cycle from 10000 through 10011. The next increment pulse 320 causes the address in the MAR 304 to wrap back to 10000. This same wrap would occur if the initial value loaded into the MAR 304 by microprocessor 52 were 10001,10010, or 10011.

The LIMIT register 306 is loaded by microprocessor 52 (FIG. 1) and specifies the end of the currently valid memory area that is currently in use within the buffer area 38a. That is, the LIMIT register 306 contains the last empty location when writing to the buffer area 38a; and the LIMIT register 306 contains the last full location when reading from the buffer area 38a). In comparator 310, the value 305 output by the MAR 304 is compared to the value in the limit register 306. Thus, the difference between the respective values in the LIMIT register 306 and the MAR 304 defines the amount of valid data available in the buffer area 38a for transmission. If the value in the MAR 304 ever becomes equal to the value in the LIMIT register 306, (i.e., the entire buffer area has been written without being read, and an attempt is made to overwrite the first unread datum), an error flip-flop (not shown) in the comparator 310 is set.

The arbitrate logic 302 allocates the ability to access the data buffer 38 among the fiber interface 26, the host bus interface 24 and the microprocessor 52. Access to data buffer 38 during memory cycles is alternated between the fiber interface 26 and the host bus interface 24 if both are repetitively making memory requests. A memory cycle can be stolen by the microprocessor 52 if either the fiber interface 26 or the host bus interface 24 skips its turn. A direction bit set by microprocessor 52 indicates to the arbitrate logic 302 which memory request it should be checking (transmit or receive) and whether a write strobe needs to be generated.

FIFO AND CONTROL

FIG. 9 is a block diagram of the circuitry 92 which implements FIFO & control function 92. The same FIFO & control logic 92 is used by both the transmit 31 and receive 29 functions of the channel 20 (shown in FIG. 1). The logic which implements FIFO & control circuitry 92 contains the FIFO 350, a header generator/checker 354, an EDC generator/checker 356, and control registers 352. The FIFO & control circuitry 92 receives a one-byte wide stream of user defined data from the unpacker 150 (for transmitting data, shown in FIG. 5) or from the fiber interface receive function (for receiving data, shown in FIG. 10).

The FIFO control 352 provides input select signal 361 to multiplexer 362 and input select signal 365 to multiplexer 366, to control the routing of data to and from the FIFO buffer 350. While transmitting data, the data buffer 38 (FIG. 4) may include block header data and EDC data, as described in greater detail below. The FIFO control logic 352 reconfigures multiplexers 362 and 366 dynamically so that all block headers are sent to the header checker 354, all EDC data are sent to the EDC checker 356, and only the user defined data are sent to the FIFO buffer 350 (and from the FIFO 350 to the serial data transfer medium 36). FIFO buffer 350 receives the user defined data in "chunks"—separated by header and EDC transmissions—but the FIFO 350 transmits the data to the serial medium 36 in a smooth stream.

On the receive side 29 (discussed below in greater detail with reference to FIGS. 10–13), the data stream received by the FIFO & control functions 92 only include user defined data. In some channels (i.e., in the I/O subsystem of a storage device controller), block headers and EDC data are added to the data stream. The FIFO control 352 dynamically reconfigures multiplexers 362 and 366 to successively transmit data from the header generator 354, the FIFO Buffer.350 and EDC generator 356, thereby injecting block headers and EDC data into the data stream. The FIFO buffer 350 receives a stream of user defined data, and transmits the data in "chunks" that are separated by the transmission of headers (from generator 354) and EDC data (from generator 356). The data buffer 38 then receives a steady data stream (via the packer 554 and 556, as shown in FIG. 13) that includes the header, user defined data and EDC.

The FIFO & Control circuitry 92 performs three operations:

(1) it receives user defined data or a combination of control data and user defined data;

(2) it modifies the received data by adding a first set of control data, and/or deleting a second set of control data; and (3) it transmits the modified data byte serially as a continuous stream.

The FIFO & control 92 is best understood by first describing the receive functions of the channel 20, with reference to FIG. 14. The block header and EDC are generated when a frame 380 of data is received by an I/O channel 20 within a device controller 37.

In the exemplary embodiment, the capabilities of the FIFO & control circuitry 92 are used for two different purposes. Referring now to FIG. 14, the first purpose is block header and EDC processing. This processing includes block header and EDC generation in the I/O receive function of a device controller 37, and block header and EDC checking in the I/O transmit function of the device controller 37. The device controller 37 is an intermediate device in the path between a host (such as host 23) and a mass storage device 39 (such as a disk or tape drive). When the host 23 transmits data to the device controller 37, the device controller 37 receives frames 380 of data formatted according to the I/O protocol (e.g., ESCON™ in the exemplary embodiment). The device controller 37 reformats the data into blocks 382 for transmission to the mass storage device 39, where the data are stored in a storage medium, such as a magnetic disk or tape (not shown).

The size of block 382 is determined by the sector size for device 39, and is typically different from the size of frame 380. Thus, in the FIFO and control circuitry 92, when a frame 380 is received from the data transfer medium 36, the user defined data in the frame 380 are repackaged into blocks. The invention allows the insertion of a block header and EDC into each block before forwarding the block of data to the device 39. In the exemplary embodiment, the EDC comprises a checksum for every fourth byte of user defined data. When receiving data frames from the serial transfer medium 36, a block header is placed in the data stream from the FIFO 350 to the packer 554 (shown in FIG. 13) before the first byte of user defined data in the block, and the EDC bytes are placed in the data stream from the FIFO 350 to the packer 554 after every block of user defined data.

Subsequently, in the transmit function, when the block is read from the device 39 for transmission over the serial data transfer medium 36, the EDC is checked (by recalculating and comparing a checksum) to determine whether an error was introduced in the data path. The EDC provides an integrity check for the data path between the controller 37 and the device 39. The EDC is separate from any error correction code that the device 39 may store for correcting errors while the data are stored in the mass storage device 39. The block header is checked by checker 354 to ensure that the correct block of data has been read. The header check operation results in a miscompare if the retrieved data are read from the wrong sector of device 39. A miscompare also results from the header check if the wrong set of good data (i.e., data having no checksum errors) is retrieved from the desired sector, i.e., because the wrong data had been stored in the desired sector.

Referring again to FIG. 9, when the channel in the device controller 37 (shown in FIG. 14) receives a frame from the serial data transfer medium 36, the header generator/checker 354 places a block header in the data stream from the FIFO 350 to the packer 552, in front of the data field. The header size value register 352a specifies the number of bytes in the header for each sector. The least significant 24 bits of the block header are provided by a counter 368 within header generator/checker 354. The counter 368 is incremented by one after each block header, so that the last 24 bits within each successive block form consecutive numbers. The counter 368 may be initialized by writing the values stored in two header seed value registers 352b and 352c, which load 32 bits (8 of which are constant) of header data. The least significant 24 bits are loaded to the counter 368 to initialize it.

When blocks of data are retrieved from the device 39 for transmission over the serial data transfer medium 36, the data are stored in the data buffer 38 within the I/O channel of the device controller 37. From the data buffer, the data are transmitted to the unpacker 150 (shown in FIG. 5), and from the unpacker 150 to the FIFO & controller 92. The remainder of the transmit path in the I/O channel of the device controller 37 is the same as for a host I/O channel 20, as shown in FIG. 4. When taking data from the data buffer 38 in the device controller 37, the block headers read from the storage medium in the device 39 are checked against the counter 368 and the constant in the header generator/checker 354. This provides an additional integrity check. If the data are retrieved from consecutively numbered sectors in the mass storage medium of device 39, and the counters within the respective headers are not consecutively numbered, then an error is flagged. If the block header is more than 4 bytes in length then the bytes remaining after the counter are 0. If there is no Header a no-header bit is set in register 352d of FIFO control 352.

While receiving data from the serial medium 36, the EDC generator/checker 356 generates a respective 4 byte EDC and appends it at the end of the data for each sector as the data are read from the FIFO 350. The data are then written to the data buffer 38. While transmitting data to the serial medium 36, the data are read from the data buffer 38 and the EDC is checked by EDC generator/checker 356. If an EDC error is detected, a signal 370 is transmitted to microprocessor 52 and an Abort EOF is sent. If an EDC error is detected, a signal is also transmitted to data path control 90 (FIG. 4) to generate the AEOF. If EDC on the sector is not being used then a No-EDC bit 352e is set.

Thus the FIFO & control 92 allows the channel to take the user defined data from received frames, recombine the data into blocks, and insert new control data "on the fly", without microprocessor intervention. Similarly, when transmitting, the channel can strip out block control data from the blocks and provide a stream of user defined data for transmission within frames, without microprocessor intervention.

One skilled in the art would readily recognize that the control data generation and checking method described above with reference to FIGS. 9 and 14 may be applied more generally to modify the control data in other ways by adding or stripping characters. The second purpose for using the FIFO a control logic 92 in the exemplary embodiment is for padding and stripping characters. The padding and stripping operations are performed by the same FIFO & control logic 92, and are typically used in the I/O channel 20 of a host processor 23.

For some processor systems (e.g., the UNISYS 2200 processor system), the native sector size within the processor differs from the sector size in the mass storage devices coupled to that processor. For example, the native sector size in the main memory of the 2200 processor system is 504 bytes, but the 2200 system uses mass storage devices that have a sector size of 512 bytes. To make the main memory sectors correspond one-to-one with respective storage medium sectors, it is desirable to add 8 extra ("pad") bytes within the I/O channel 20 when transmitting 504 bytes of user defined data from the host 23 to a storage device (e.g., device 39 shown in FIG. 14) that uses 512 byte sectors. Conversely, when receiving a sector's worth of data from the same storage device, the channel 20 assumes that 8 bytes of pad data are included in the data received. The channel "strips" these 8 bytes out.

Referring to FIG. 9, in the exemplary embodiment, a bit 352g is set to indicate that the channel is operating in channel pad mode. The sector size value register 352f and header size value register 352a are used in the channel pad mode of operation. When the channel pad mode bit is set, the channel sends pad bytes of zeros on data blocks sent on the serial data transfer medium 36, and strips the pad bytes from data received over the serial data transfer medium 36. For example to convert 504-byte data block from the host to 512 byte data block for transmission to the device 39, a sector size value of 504 is specified and a header size value of 8 is specified. A header seed value stored in register 352b is set to 0 and zeros are appended to and stripped from the end of a data block.

While transmitting data to the serial medium 36 in the channel pad mode, FIFO control 352 dynamically configures multiplexers 362 and 366 to transmit the user defined data and then to transmit pad data from the header generator 354. While receiving data in the channel pad mode, the multiplexers 362 and 366 are dynamically configured to receive the user defined data and then to discard the pad data.

The FIFO 350 is 9 bits wide by 32 deep. The FIFO control block 352 contains the sector size value register 352f which specifies the size of the sectors (in bytes). The total data count for multiple frames (excluding headers and EDC) is kept in the data count register 352g. This register can be used for keeping track of the data count of a data chain. It counts up to 64K (the max data chain size). When the headers and EDC are disabled the FIFO & control 92 is just a straight pass through. In that case, the data count register is still active.

The FIFO & control logic 92 functions relieve the microprocessor 52 of the tasks of computing headers and EDC. Without the FIFO & control 92, the microprocessor 52 would be involved in header generation and in computation of EDC for every byte. The FIFO & control 92 of the exemplary embodiment of the invention allows these processes to occur asynchronously to the other processes in the microprocessor 52.

One skilled in the art of designing digital I/O circuitry would recognize that the FIFO & control logic 92 is provided in the exemplary embodiments to support header/EDC generation and checking in the I/O subsystem of a device controller 37, or to support character padding/stripping in the I/O subsystem of a host processor 23. A variation (not shown) of the exemplary I/O subsystem may also be constructed without the FIFO & control functions 92, if neither the header/EDC or padding/stripping capabilities is desired. For example, with reference to FIG. 4, if FIFO & control 92 is omitted, unpacker 150 is connected directly to the input 101a of multiplexer 102. Similarly, the FIFO & control functions 92 would be omitted on the receive functions shown in FIG. 13, and received user defined data would be routed directly to a packer (deserializer) 554 (shown in FIG. 13).

FIBER INTERFACE RECEIVE

Figure 10:
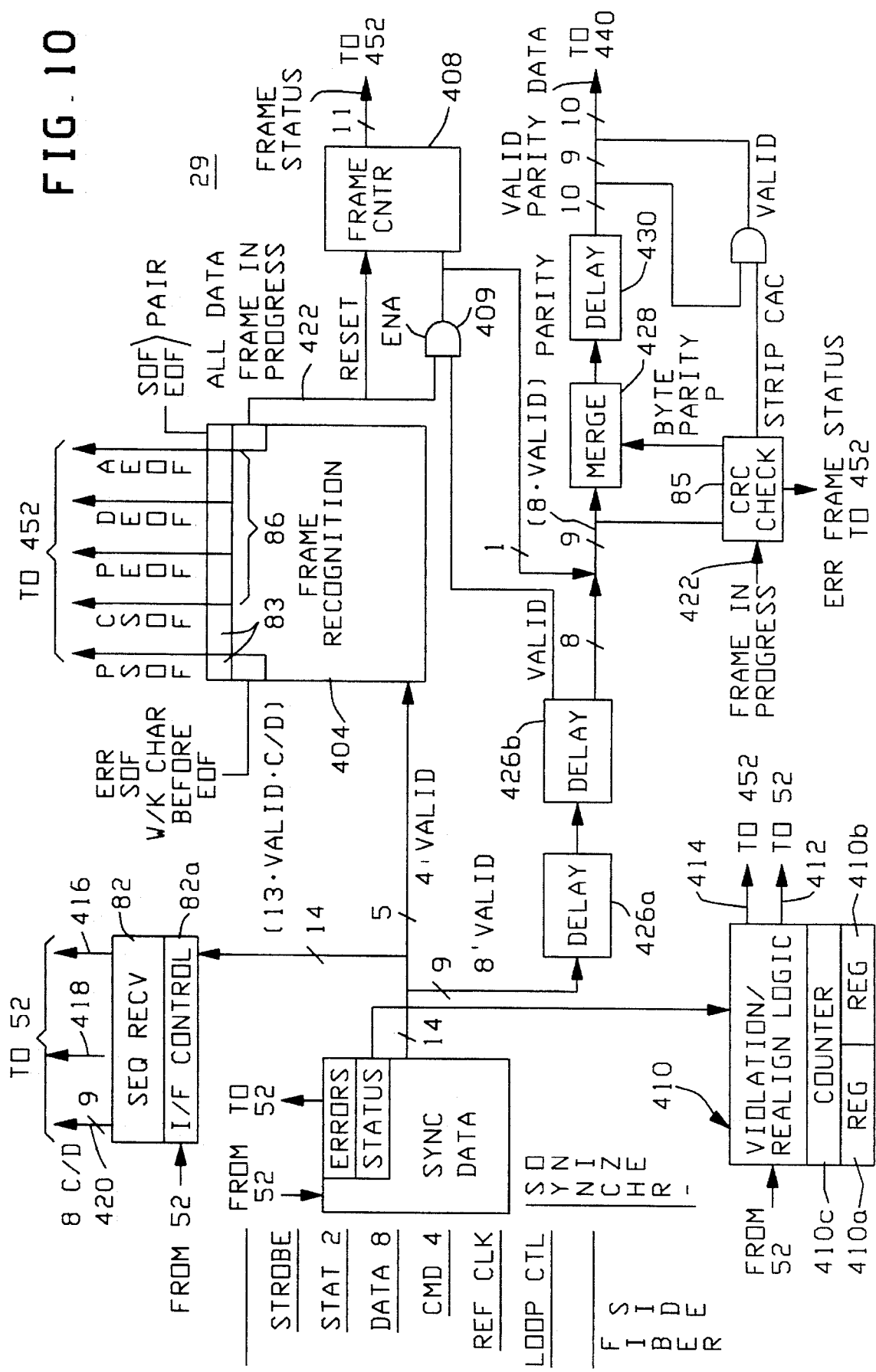
FIG. 10 is a detailed block diagram of the receive logic shown in FIG. 3.
Figure 11:
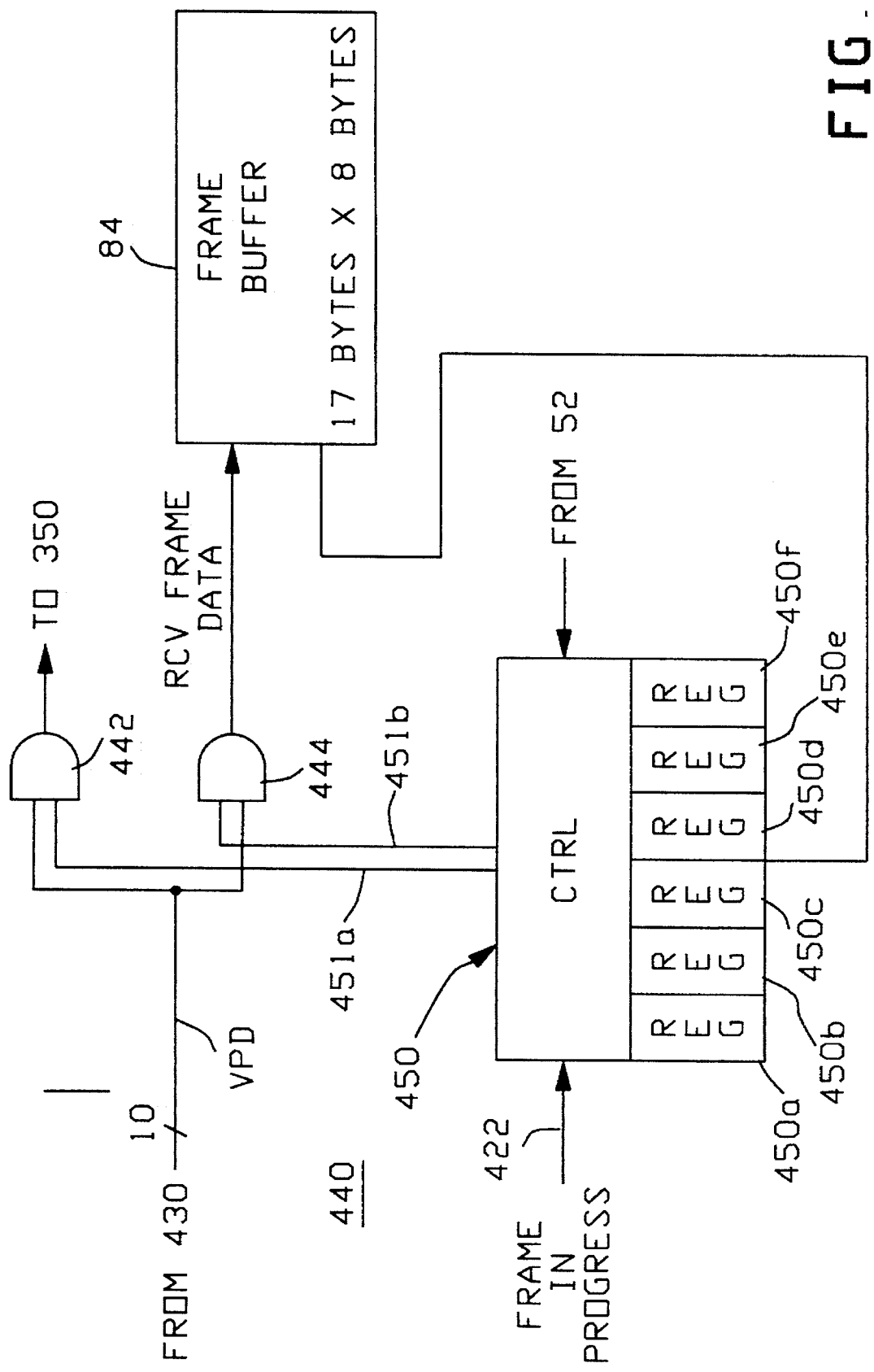
FIG. 11 is a block diagram of the control logic for switching the received data processed by the receive logic shown in FIG. 10.
Figure 12:
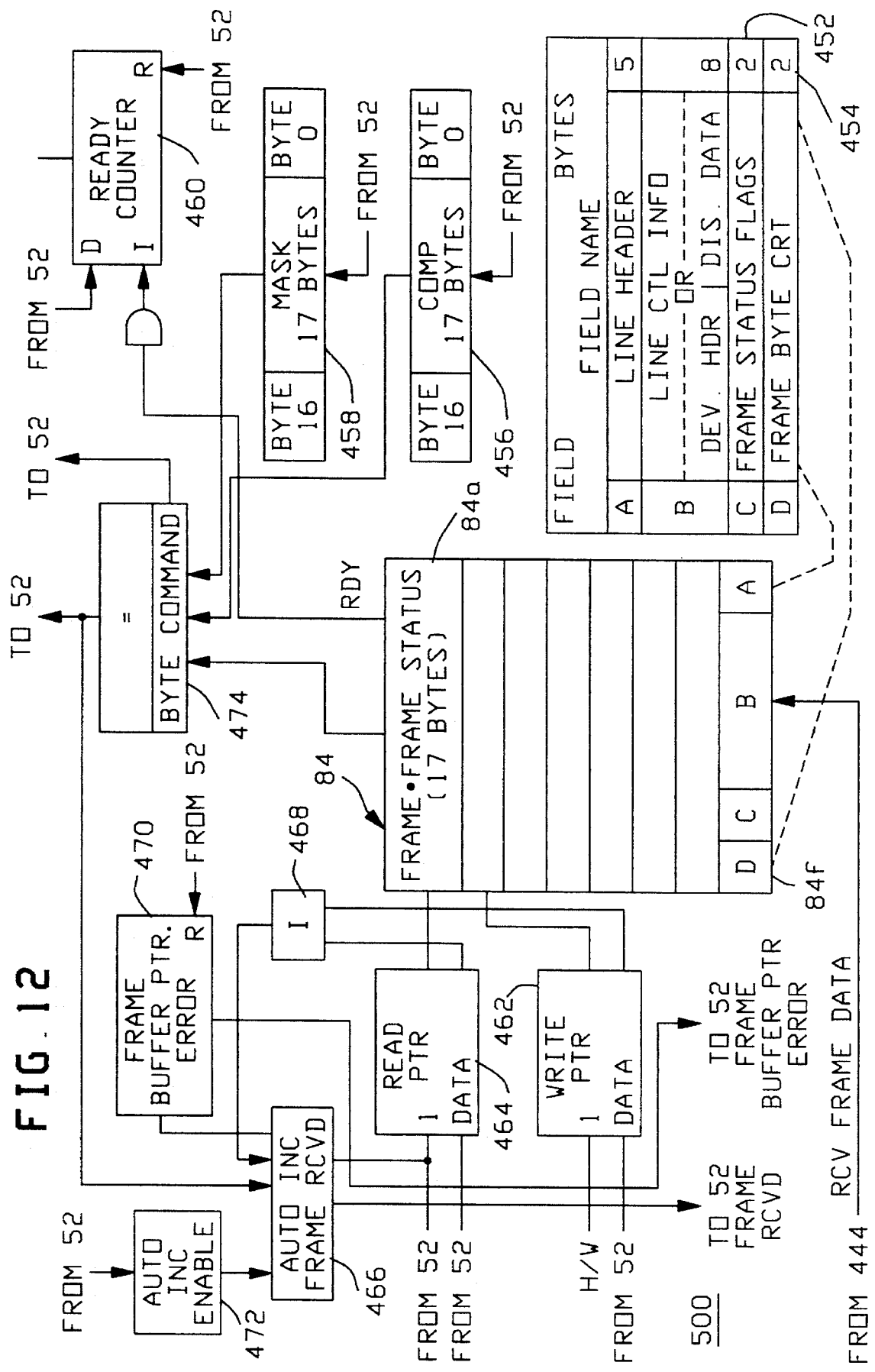
FIG. 12 is a detailed block diagram of the receive frame buffer logic shown in FIG. 11.
Figure 13:
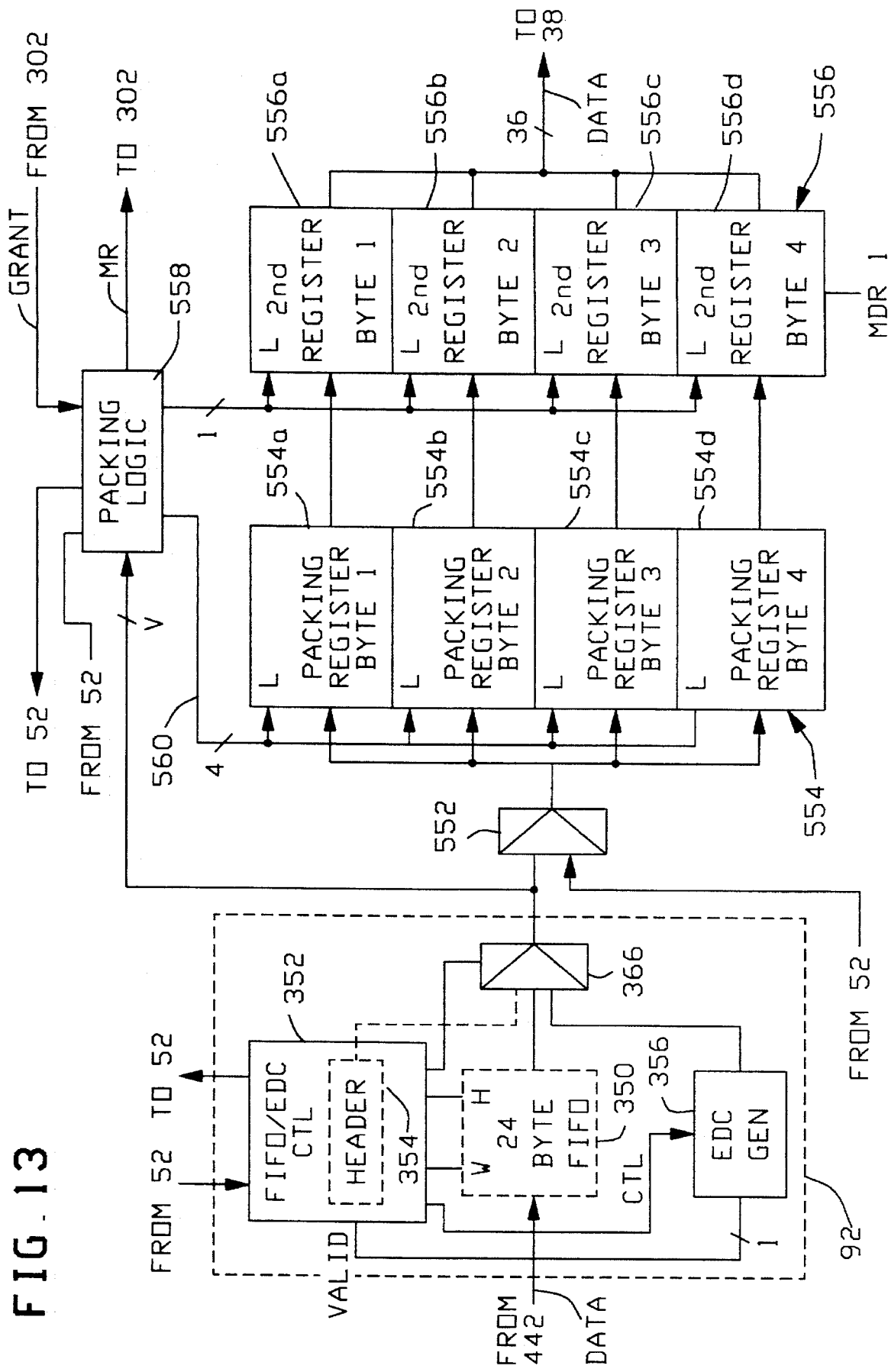
FIG. 13 is a block diagram of a packer circuit for deserializing the data stream output by the switch shown in FIG. 11.

FIGS. 10-12 are detailed block diagrams of the receive logic hardware 29 of the fiber interface 26. Referring first to FIG. 10, the fiber interface receive logic 29 includes the sequence receive logic 82, frame recognition logic 404, CRC checker 85, frame counter 408 and violation/realign logic 410. The receive logic 29 receives, strips out and processes the control data in each frame.

The frame receiving logic 29 receives and identifies a frame header from the data transfer medium 36. According to the invention, frame receiving logic 29 and microprocessor 52 verify link and device level I/O protocol compliance asynchronously while any user defined data that are included in the frame are being received, and store the user defined data in the parallel storage medium 38, if any user defined data are included. Frame receiving logic 29 performs a CRC check and captures the type of SOF and type of EOF and stores them in the frame status bytes 452 of a frame buffer 84.

Microprocessor 52 configures the Cycle Burst Control function 94 (shown in FIG. 4) to process an expected type of frame, and identifies the expected type of frame to the receiving logic 29. The receive logic 29 then compares the expected type of frame to the actual type received. If the result of the comparison is a match, then the current flow of execution continues, using the information previously loaded into Cycle Burst Control function 94 (shown in FIG. 4). Frame processing latency is reduced if the actual frame type matches the expected frame type, because the Cycle Burst Control 94 is already configured to process the frame.

If the result is a miscompare, then the frame status bytes 452 are provided to the microprocessor 52, which examines the frame status and further interrogates the frame. Microprocessor 52 may still determine that the frame complies with the device level I/O protocol, in spite of the miscompare. The result of miscompare processing by the microprocessor 52 is that the latency reduction from pre-configuring the Cycle Burst Control 94 (FIG. 4) is not realized for the one frame that causes the miscompare. In the exemplary embodiment, compliance with the device level protocols of chapter 7 of the ESCON I/O Specification are verified.

The receive logic 29 is reset by a signal from the frame recognition logic 404, after an SOF-EOF pair is detected. The fiber interface controls are contained in the Interface Control Register 82a, within the sequence receive logic 82. CRC checking 85, frame counter 408 and frame recognition 404 hardware do not provide output signals directly to microprocessor 52 (FIG. 1). However, their states are written into the Frame Buffer 84 (shown in FIG. 12) in the frame status area 452 for each frame that is received.

The sequence receive logic 82 receives all incoming characters for monitoring the state of the link between the channel 20 and the sender of the data. Sequence receive logic 82 provides an output signal to the microprocessor 52 only in response to sequences of special characters that indicate a change in the state of the link. These sequences include sequences of special characters that precede the first SOF (link initialization) and the characters (e.g., idles) between an EOF and the next SOF that follows that EOF.

The sequence receive logic 82 sends a sequence change interrupt 416 to microprocessor 52. This indication is reset when the microprocessor reads the sequence character 420. An additional signal 418 indicates that no sequence is currently being received.

The exemplary sequence receive logic implements the states and state-to-state transitions specified in Appendix B of the ESCON I/O interface specification, referenced above. In the exemplary embodiment, the sequence receive logic 82 is implemented as a state machine. The sequence receive logic 82 is discussed in greater detail below with reference to FIG. 15.

In the exemplary embodiment, the SOF recognition and EOF recognition functions 83 and 86 (shown in FIG. 3) are both included within the frame recognition logic 404, as shown in FIG. 10. The frame recognition logic 404 strips the SOF and EOF characters from the frame of data. In a normal data stream, the frame recognition logic 404 detects SOF-EOF pairs. When the SOF recognition function 83 of frame recognition logic 404 detects an SOF, it transmits a frame-in-progress signal to frame counter 408, CRC checker 85 and the receive frame buffer switch control 450 (shown in FIG. 11). The frame recognition logic 404 then waits until the EOF recognition function 86 detects an EOF character. An identification of the type of SOF and type of EOF in the pair is transmitted to the frame status flag bytes 452 of the receive frame buffer 84.

If frame recognition logic 404 detects two SOF characters without an intervening EOF character, or an SOF character followed by any special ("K") character without an intervening EOF character, then frame recognition discontinues the frame in progress signal 422 and transmits an error signal 424 to microprocessor 52.

In the exemplary embodiment, frame recognition logic 404 implements the rules for defining a frame set forth in chapter 2 of the ESCON I/O Interface specification, referenced above. One skilled in the art can readily construct the frame recognition logic from a plurality of registers for storing the SOF and EOF characters, and comparators for checking the incoming characters in the data stream to detect the presence of SOF or EOF characters.

While the frame in progress signal 422 is transmitted by the frame recognition logic 404, the frame counter 408 begins to count the number of valid bytes in the frame. An AND gate 409 transmits a signal that increments the frame counter 408 when the frame in progress signal 422 is in its active state and the valid bit of the received data is set. The count of bytes in the frame is transmitted by frame counter 408 to the frame byte count bytes 454 of the receive frame buffer 84 (shown in FIG. 12). The frame counter 408 is reset when the frame in progress signal 422 changes to its inactive state.

When the frame in progress signal 422 is first sent, the CRC checker 85 begins to compute a CRC based on the data in the frame and generates a parity bit for every byte, which is merged with the byte stream in block 428. When the EOF is detected, by definition, the last two bytes before the EOF are the CRC of the incoming data stream. Delay elements 426a and 426b delay the stream of data to the CRC checker 85 by the amount of time it takes to receive two bytes, so that when the frame in progress signal 422 stops, CRC checker 85 recognizes the next two bytes it receives as CRC. The data stream is delayed in block 430, while the result of the CRC check is provided to the frame status bytes 452 of the receive frame buffer (shown in FIG. 12). If the CRC checker 85 detects an error, an error signal is provided to the frame status bytes 452 of the receive frame buffer 84 (shown in FIG. 12). The CRC checker 85 also strips the CRC bytes from the frame.

The violation/realign logic 410 times the violation and realign status sent from the serial link driver 34. The violation/realign logic 410 has a counter 410c, a programmable violation character timer register 410a for determining when to increment counter 410c, and a programmable threshold register 410b for selecting a counter value that causes the interface 26 (shown in FIG. 1) to enter a loss-of-synchronization state.

In the exemplary embodiment, the value of register 410a may be set to 15, so that violations within 15 character times increment the counter 410c, and 15 character times without a violation decrements the counter 410c if its value does not equal 0. In the exemplary embodiment, the value of register 410b may be set to 4, so that if counter 410c reaches a count of 4, then a loss-of-synchronization state is entered. Violation/realign logic 410 has 2 output signals, 412 and 414. The first output signal 412 is set on any violation. This bit is written into the frame status 452 bit of receive frame buffer 450, and is reset by hardware (not shown) on a frame basis. The second output signal 414 is set when the count of violations in counter 410c exceeds the limit value stored in register 410a, i.e., when the violation counter 410c reaches its threshold. This signal stays set until microprocessor 52 reads and resets it.

RECEIVE FRAME BUFFER SWITCH CONTROL

FIG. 11 is a block diagram of the receive frame buffer switch control logic 440, including the switch control logic 450. Logic 450 directs the incoming stream of bytes within the frame to either or both of the frame buffer 84 and/or the FIFO 350 (shown in FIG. 9). Frame headers are stored in the frame buffer 84 for frame validation. User defined data are sent to the FIFO 350 and are then deserialized and transmitted to the data buffer 38 (FIG. 1).

The frame buffer switch control logic 450 includes a switch count value register 450a, a switch frame type register 450b, a switch compare value register 450c, a switch compare mask register 450d, a switch DMA on register 450e and a switch override enable register 450f.

The switch control 450 provides enable signals 451a and 451b to either or both of the respective AND gates 442 and 444, so that data are sent to frame buffer 84, FIFO 350 (shown in FIG. 9), or both. The first 13 bytes of every frame are sent to the frame buffer 84, along with two frame status bytes 452 and two frame count bytes 454. The switch count value register 450a indicates how many bytes are sent to the frame buffer 84 before the received bytes start going to the FIFO 350. After the first 13 bytes, if the switch has not been made, a frame overrun is indicated in frame status, and the remaining bytes in the frame are lost. The receive frame buffer 84 stores the frame headers for asynchronous header validation processing, as described below with reference to FIG. 12.

Once the data are in the FIFO, the pad bytes are stripped (if the channel 20 is in the I/O system of a host 23) or the header and EDC are added (if the channel 20 is in the I/O system of a controller 37), as described above with reference to FIG. 14. From the FIFO 350, the data are then provided to the parallel storage medium (data buffer 38, shown in FIG. 1).

The value of the switch frame type register 450b is set to indicate what type of frame the microcode in microprocessor 52 expects to receive. A value of "one" in register 450b applies the compare and mask to the fifth byte of the link header. A value of zero in register 450b verifies that bit 7 of the fifth byte is zero and applies the compare and mask to the sixth byte. This allows for recognition of frame types that have contents longer than the 13 byte length that the receive frame buffer 84 can accommodate. By example, identifier response (IDR) and link incident data (LID) frames (as defined in the ESCON I/O Specification) have more than 13 bytes and are only provided in response to an action by channel 20, so that microprocessor 52 is able to anticipate these frames and set the switch frame type register 450b. If register 450b is set, then a buffer area 38a is allocated in the data buffer 38. (shown in FIG. 1) to store the IDR or LID function. One skilled in the art would understand that this method may be adapted to handle changes in the I/O protocol that might result in additional frame types longer than 13 bytes in length. The method may also be adapted for other I/O protocols in which predictable frame types have large contents.

Referring again to FIG. 11, the switch compare value register 450c is loaded with the bits expected for the switch to occur. The switch compare mask register 450d marks the bits that are significant in the switch compare value. If a link control frame is expected, then the fifth (link control) byte is compared to the compare value & mask 450d. If a data frame is expected, then the fifth (link control) byte bit 7 is checked for 0 and the sixth (IFI) byte is compared to the compare value & mask register 450d value.

The register 450e, when set, enables the entire frame to the FIFO 350, for transmission to the data buffer 38 (shown in FIG. 1). The header and frame status still go to the frame buffer 84. The switch register 450f, when set, turns off switching. If this is set, no data goes to the FIFO 350.

In operation, switch 450 allows frames to be programmatically directed to both the frame buffer 84 and to the data buffer 38 via FIFO 350. The frame "header information" is sent to the frame buffer 84 until the "switch point" identified in register 450a. When the "switch point" is reached, the actual frame header data received are compared to the expected frame header data stored in the switch compare value register 450c. If the received frame information matches the expected frame header data in register 450c, then the frame's "DIB data" are sent to the Data Buffer 38 via FIFO 350. At the end of the DIB, the switch 450 is reset to enable the transmission of data to the frame buffer 84. The frame status and byte count is then written into respective fields 452 and 454 of the frame buffer (shown in FIG. 12).

In the example below, it is assumed that a frame having a 1K DIB size expected. Only the link header, device header and status bytes are stored in the Frame Buffer 84, while the actual 1K of user defined data are transmitted to the data buffer 38 via the FIFO 350. The register values and resulting operations are as follows:

1) The value of switch DMA on register 450e is set to 0. The frame "header information" goes to frame buffer 84 only, Not into the FIFO 350.
2) The value in the switch override enable register 450f is set to 0. This allows switching to occur.
3) The value in the switch frame type register 450b is set to 0. This indicates that a device frame is expected as opposed to a link-control frame.
4) The value in the switch compare value register 450c is set to 0001 0000 (10 hexadecimal). This indicates that an IFI byte indicating a data frame is expected.
5) A value of 1111 1111 (FF hexadecimal) is loaded into the switch compare mask register 450d. This indicates that all bits in the IFI byte are to be compared against the values in the switch compare value register 450c.
6) A value load of 1001 (9) is loaded into the switch count value register 450a. The first 9 bytes (0 thru 8) from the frame are stored into the frame buffer 84. The next 1024 bytes (9 thru 1032) go into the data buffer 38 via the FIFO 350.
7) While the 1024 bytes of user defined data and the two bytes of CRC are stored into the FIFO 350, a value is generated from the received data and the received CRC by CRC check function 85, shown in FIG. 10.
8) After the 1024 bytes of user defined data and the CRC, the data path is again switched so that the data are provided to the frame recognition logic 404. When the EOF is received, the frame in progress signal 422 is discontinued and the value computed by the CRC checker 85 is compared to an expected value. The two-byte CRC is not passed on to the FIFO 350.

RECEIVE FRAME BUFFER

FIG. 12 is a block diagram of the receive frame buffer logic 500. The frame buffer logic 500 in the receive data path 29 (FIG. 1) includes a frame buffer 84, a mask register 458, a compare register 456, frame buffer read pointer 464, compare logic 474, frame buffer write pointer 462 and auto increment logic 466.

The frame buffer 84 is a stack of registers 17 bytes wide which receives a frame header (or an entire small frame, such as a control frame). The frame buffer 84 is loaded by the receive frame buffer logic 500 and is read by the microprocessor 52 (shown in FIG. 1). The frame 84a at the top of the stack (pointed to by the read pointer 464) is transmitted to the compare logic 474 and the microprocessor 52. The frame buffer can store 8 frames 84a–84f at a time.

Referring to FIG. 12, the mask register 458 is loaded by microprocessor 52. The Value in mask register 458 is loaded to the compare logic 474. The compare register 456 is loaded by microprocessor 52. The value in register 456 is also transmitted to the compare logic 474. Compare operations in logic 474 are only valid on bit locations which have a 1 in the mask register 458. That is, if a mask register bit is set to zero, and the respective bits in frame header 84a and compare register 458 (at the same location as the zero mask bit) differ from one another, compare logic 474 does not recognize this condition as a miscompare.

The mask register 458 permits the compare operation to produce a match indication even if selected fields do not have a predetermined value. For example, according to the ESCON™ I/O protocol, a ready bit in the header of a received frame may be set to either zero or one in a valid frame header. Therefore, the bit in mask register 458 at the same location as the ready bit in the compare register 456 is set to zero. If all other bits in registers 456 and 458 match except for the ready bit (which has a mask bit value of zero), then the compare operation in logic 474 results in a match. It is understood by one skilled in the art that other types of header data that are expected to vary may also be accommodated by setting the respective mask bits to zero.

Referring again to FIG. 12, the write pointer 462 is incremented by the frame receive logic 29 (shown in FIG. 10) after a frame is received. The write pointer 462 points to the register 84a–84f that is currently being filled, if data are currently being written to the frame buffer 84. The write pointer 462 points to the next empty 17 byte register 84a–84f in the frame buffer 84, if data are not currently being written to the frame buffer 84.

The read pointer 462 points to the register 84a–84f containing the next frame header that the compare logic needs to verify. The read pointer 464 may be incremented automatically (described further below) if the result of the compare between the frame status bytes 452 of the received frame header 84a and the data in the compare register 456 is a match. The read pointer 464 may also be incremented under control of microprocessor 52 if a miscompare is detected by the compare logic 474. A microcode readable condition is set by compare logic 474 when the read pointer is not equal to the write pointer. (An error is set when the write pointer increments to a value which equals the value of the read pointer). Microprocessor 52 may still determine that a received frame header is valid, even though the initial screening by the compare logic does not result in a match.

If the microprocessor evaluates the cause of the miscompare and determines that a bad frame has been received, it then invalidates the data in the data buffer. A frame containing an appropriate response (as defined by the I/O protocol) is transmitted to the sender of the bad frame.

The above structure allows reduction of the workload of microprocessor 52. The compare logic 474 performs an initial "screening" of the frame headers. Most received frame headers include predictable data. For example, in an I/O operation that spans 25 frames of data, most of the frames are expected to have the same header information in all fields, except for a limited number of fields that are known to vary randomly, such as the ready bit, discussed above. Once the microprocessor 52 loads the compare register 456, most of the frames received for the I/O operation result in matches, and the compare logic "approves" the frame headers without further inspection by the microprocessor 52. If unexpected information in the header results in a miscompare, the microprocessor has more time available for evaluating the cause of the miscompare, because the microprocessor has been freed from the task of evaluating the routine, predictable frame headers.

Similarly, when the channel 20 has sent a frame that requires a response, the microprocessor can load the expected response frame header into the compare register 456 when a frame is received.

The read pointer auto increment function 466 is enabled by microprocessor 52 when the microprocessor 52 stores an expected frame header in the compare register 456. Once the auto increment function 466 is enabled, the read pointer 464 is automatically incremented, if the read pointer 464 and write pointer 462 are not equal and the output signal of the compare logic 474 indicates that the frame header in the current register 84a matches the information stored in the compare register 456. When the read pointer 464 is automatically incremented, the frame header that caused the match to occur is accepted as "correct", i.e., the frame is of the expected type.

The ready counter 460 is always enabled. Every received frame that has a "one" in the ready bit position increments the ready counter 460. A "ready" is received if the sender of the "ready" is ready to accept a new request. As described above with reference to FIG. 11, a frame that has its ready bit set may be received at any time. Therefore, it is desirable for the reception of headers to be automated by setting the mask bit to zero in the ready bit position, so that the compare logic 474 ignores the ready bit when determining whether a match or a miscompare has occurred. Because the compare logic 474 ignores the ready bit (assuming the ready bit position in the mask bit register 458 is set to zero), and the microprocessor 52 does not examine the frame header if the compare logic 474 identifies a match, the ready counter 460 is used to track the number of readies received. The microprocessor 52 inspects the ready counter asynchronously, and decrements the ready counter when it processes a ready.

Thus, ready counter 460 allows a single bit within the header to be parsed by hardware without intervention by the microprocessor 52. The microprocessor 52 determines the fields that are expected to have the same values in every received frame (during an I/O operation). These fields are inspected by hardware for a match asynchronously and independently of the microprocessor 52. The microprocessor is spared from inspecting many frame headers by this method. But even in the frame headers that are not inspected by the microprocessor 52, the ready counter 460 allows independent evaluation of the value of the ready bit.

One skilled in the art would understand that the capability to automate the asynchronous evaluation of the ready value may be extended to other uses for checking the value of a single bit. Furthermore, a field of multiple bits may be examined by providing a register (not shown) for each predetermined value of the field, along with comparators to determine whether the received bits match any of the predetermined values.

With the same frame buffer logic 500, an alternative method for processing the "readies" is to set the respective mask bit to "one" in the mask register 458 and the respective compare bit to zero in the compare register 456, for the location of the ready bit. This causes a miscompare each time a frame is received that has its ready bit set to "one". Once the miscompare is detected, the microprocessor processes the ready indication. Although the frame buffer logic 500 may be operated in this fashion, the exemplary method described above requires less intervention by microproces-

PACKER

Reference is now made to FIG. 13, which is a block diagram showing the packer function. The packing logic 558 controls the loading of the two 32 bit registers 554 and 556, which receive a byte wide stream of data from the FIFO and control 92 and send the data to the data buffer 38 (shown in FIG. 1).

The first rank of the packer is the packing register 554. The loading of packing register 554 is controlled by the packing logic 558. In the exemplary embodiment, the packing logic 558 comprises a 4 bit rotating shift register (Packer Pointer). The output signal 560 of the packing logic 558 comprises four bits, including three zeros and a single one. The one shifts to successive positions with each clock. A one in the output signal 560 of rotating shift register 558 enables the load of the next received byte of data into the next respective byte in the packing register. For example, if the one is in the least significant bit position of signal 560, then the least significant byte is being loaded in the packing register. The Packer Pointer 558 shifts when a byte is moved from the FIFO 352 to the packing register 554.

Once the four bytes of data are loaded into the packing register 554, they are simultaneously loaded to the second rank, register 556 on the next clock. The four bytes of data in register 556 are transferred to the parallel storage medium (data buffer 38) on the next clock cycle.

If the memory interface does not take data for any reason, the FIFO 352 overflows. An error condition is reported to microprocessor 52 when the FIFO 352 overflows.

SEQUENCE RECEIVE LOGIC

Figure 15:
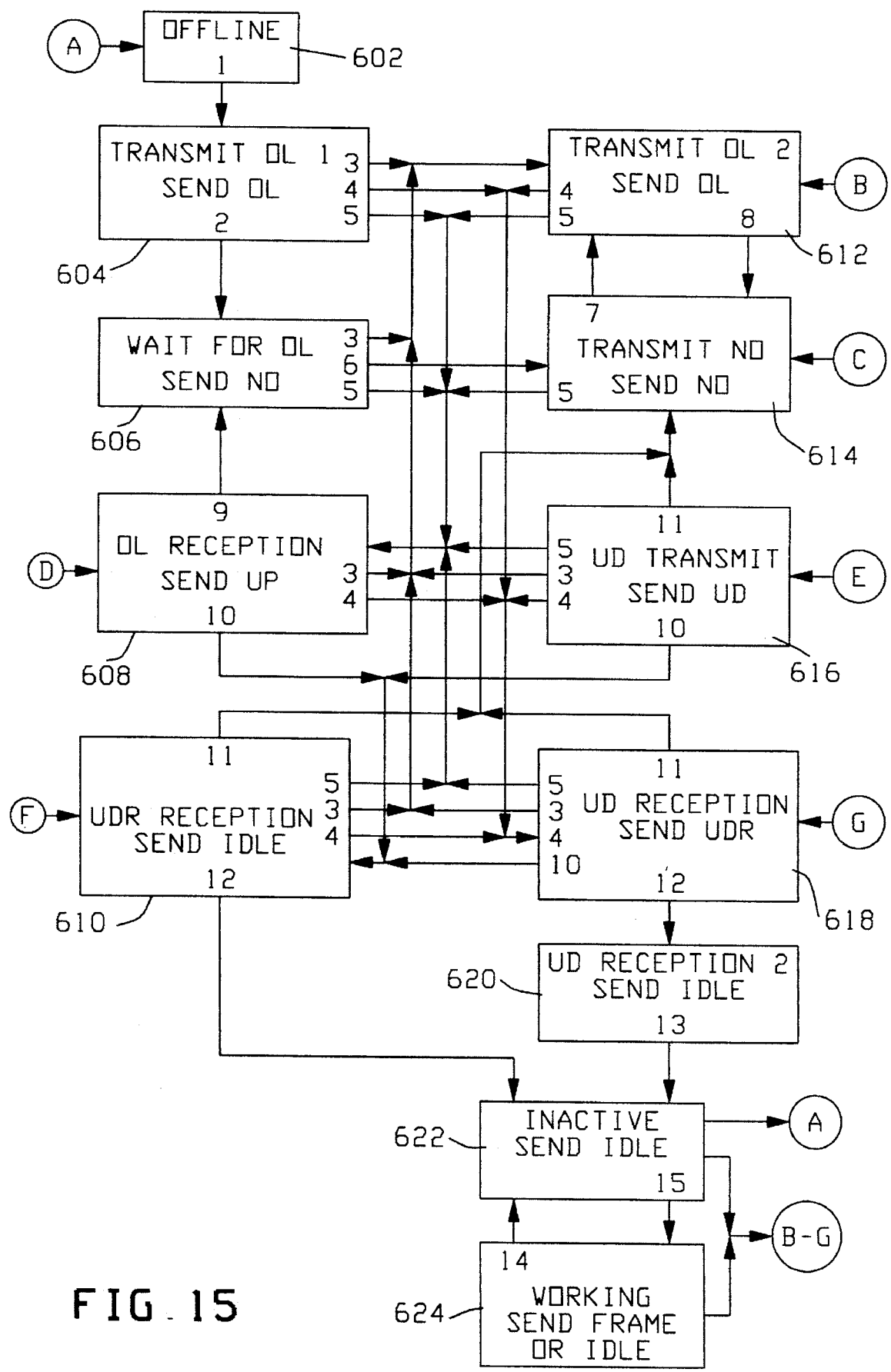
FIG. 15 is a state diagram of the sequence receive logic shown in FIG. 10.

FIG. 15 is a state diagram of the channel 20 (FIG. 1) for the exemplary embodiment. As shown in FIG. 15, a change in channel state occurs when the channel 20 detects a change in the sequence of characters received (The state may also change for other reasons, e.g., in the event of a timeout). In the exemplary embodiment, sequence receive logic 82 (shown in FIG. 10) detects the sequence change and transmits an interrupt to the microprocessor 52, and presents the new sequence being received to the microprocessor. Microprocessor 52 changes the state of the channel 20 according to the rules of the link level I/O protocol. Although the exemplary sequence receive logic 82 detects and captures the allowable sequences and sequence changes specified in chapter 4 of the ESCON I/O Specification (and microprocessor 52 responds to the detection), it is contemplated that other I/O protocols may be used. By allocating sequence reception to sequence receive logic 82 and the interpretation of the sequence change to microcode in microprocessor 52, the system is readily adapted for use with different communications protocols.

The channel starts in an offline state 602. To transmit user defined data, the channel is in the working state 624. FIG. 15 shows the states through which the channel passes going from the offline state 602 to the working state 624.

The allowed states are:

(i) "Offline"

(ii) "Transmit Offline (OL) Sequence" or "Transmit OL";

(iii) "Wait for Offline Sequence" or "Wait for OL";

(iv) "Transmit Non-Operational (NO) Sequence" or "Transmit NO";

(v) "Offline Reception" or "OL Reception";

(vi) "Unconditional Disconnect (U/D) Sequence Transmission" or "UD Transmit";

(vii) "Unconditional Disconnect Sequence Reception" or "UD Reception";

(viii) "Unconditional Disconnect Response (UDR) Sequence Reception" or "UDR Reception";

(ix) "Inactive"; and (x) "Working"

Table 1 lists the state exit conditions, many of which result from sequence changes that are detected by sequence receive logic 82, shown in FIG. 10. In the link initialization and recovery states 602–620 shown in FIG. 15, the exit conditions that enable transition to a new state are shown as numbers 1–13 within the state blocks 602–624. The arrow next to each exit condition number 1–13 indicates the state to which the channel transitions when the respective exit condition is present. States 622 and 624 are the respective Inactive and Working states, which the channel 20 must reach in order to perform device level functions (i.e., to actually transfer user defined data). Once the channel reaches the Inactive state 622, it is ready to transmit or receive frames of user defined data.

TABLE 1

State Exit Conditions

1—Transmit the Offline sequence for at least 1 second.

2—Detect a Loss of Sync or Signal condition, or Interval Timeout type H.

3—Receive the Not-operational sequence. This transition also causes the port to record a Link Fault condition.

4—Receive the Unconditional-disconnect sequence.

5—Receive the Offline sequence.

6—Receive the Unconditional-disconnect or Unconditional-disconnect-response sequence. This transition also causes the port to record a Link Fault condition.

7—Receive the Not-operational sequence.

8—Detect a Loss of Sync or Signal condition, or Interval Timeout type I.

9—Detect a Loss of Sync or Signal condition, or Interval Timeout type J.

10—Receive the Unconditional-disconnect-response sequence.

11—Detect a Loss of Sync or Signal condition, or Interval Timeout type K. This transition also causes the port to record a Link Fault condition.

12—Receive at least 16 Idle ordered sets.

13—Transmit at least 64 Idle ordered sets.

14—Transmit or Receive an EOF disconnect ordered set as part of a valid frame.

15—Transmit or Receive an SOF connect ordered set as part of a valid frame.

A—The link-level facility determines that it is to be taken offline and transmits the Offline sequence for 1 ms minimum.

B—The link-level facility recognizes the Not-operational sequence.

C—The link-level facility determines a link-signal error has persisted for longer than a Link-Interval Duration time.

D—The link-level facility recognizes the Offline sequence.

E—The link-level facility determines that connection recovery needs to be performed.

F—The link-level facility recognizes the Unconditional-disconnect-response sequence.

G—The link-level facility recognizes the Unconditional-disconnect sequence.

When the channel is in the Inactive state (block 622), and an SOF is received, (exit condition 15) the channel enters the Working state. Ordinarily, sequence receive logic 82 waits until a DEOF is received (exit condition 14) and the channel returns to the Inactive state. The sequence receive logic 82 then detects the idle sequence until another SOF is received. As long as the sequences transmitted and received comply with the link level protocols, the channel can continue alternating between the Inactive and Working states.

Exit conditions A–F result in the channel changing from either the Inactive or Working state to one of the link initialization or recovery states 602–620. Exit condition A is a normal link termination for an inactive link. Exit conditions B, D, F and G occur when the sequence receive logic 82 (shown in FIG. 10) detects the reception of an NO, UD or UDR sequence function from the sender, and provides an interrupt to microprocessor 52. Exit conditions C and E occur when the channel detects an error condition that requires the channel to initiate a recovery action.

Table 2 specifies the timeout definitions that are referenced in the exit conditions of Table 1.

Table 2

Interval Timeout Type Definitions

H—The link-level facility has interrogated the information received on the link for at least a Link-Interval Duration time and no other condition for exiting this state has occurred.

I—The Not-operational sequence has not been detected for a Link-Interval Duration time and no other condition for exiting this state has occurred.

J—The Offline sequence has not been detected for a Link-Interval Duration time and no other condition for exiting this state has occurred.

K—The link-level facility or dynamic switch port has been in this state for a Connection-Recovery-Interval Duration time and no other condition for exiting this state has occurred.

One skilled in the art could readily construct the sequence receive logic 82 function to detect the respective changes in the received sequence that cause these state transitions.

An exemplary I/O subsystem employing dedicated hardware components to asynchronously form control information (including sequence functions, frame delimiters, CRC, block headers and EDC) and to inject the control information into the data stream with minimal microprocessor intervention. The exemplary I/O subsystem further includes hardware components which identify and support the microprocessor in validating received control information, and which strip the control information from the data stream with minimal microprocessor intervention. One skilled in the art would recognize that the hardware architecture defined above may be adapted to other I/O protocols besides the ESCON I/O protocol.

While the invention has been described in terms of exemplary embodiments, it is contemplated that it may be practiced as outlined above within the spirit and scope of the appended claims.

What is claimed:

1. In an Input/Output (I/O) subsystem coupled to a serial data transfer medium that transmits data from a sender to a recipient, the I/O subsystem processing a frame comprising user defined data and frame control data received over the serial data transfer medium, apparatus comprising:

a processor for determining a block header size and a native sector size of the recipient;

means coupled to the processor for receiving and storing the block header size and the native sector size;

means for receiving and validating the frame from the serial data transfer medium, and for transmitting the user defined data to a first-in, first-out (FIFO) buffer;

means for forming a block header having said block header size, the block header comprising control data that are used by the recipient, the block header forming means being independent from the FIFO buffer;

switching means connected to the block header forming means to receive the block header therefrom and to the FIFO buffer to receive a subset of the user defined data therefrom, for transmitting one of the block header and the subset of the user defined data to a parallel storage medium of the recipient; and control means separate and distinct from the processor and operating without interfering with operation of the processor and independently therefrom, for providing signals that configure the switching means to alternately transmit: (1) the block header from the block header forming means until a number of bytes equal to the block header size have been transmitted and (2) the subset of the user defined data from the FIFO until a number of bytes equal to the native sector size have been transmitted, the native sector size being differerent from a size of the frame, wherein said control means provide said signals to the switching means based on how many bytes of data have been transmitted to the parallel storage medium.

2. Apparatus according to claim 1, wherein the I/O subsystem is the I/O subsystem of a mass storage device controller, and the recipient is a mass storage device, the I/O subsystem coupling the device controller to a host processor system via the serial data transfer medium, the device controller receiving the frame from the host processor and transmitting the user defined data to the mass storage device within the data block.

3. Apparatus according to claim 2, wherein the frame includes an amount of user defined data that is greater than the native sector size of the mass storage device and the control means includes means for dividing the user defined data in the frame into a plurality of data blocks.

4. Apparatus according to claim 3, wherein the block header forming means comprises a counter for providing consecutively numbered block identification numbers for inclusion in the block header of each successive frame, each having an amount of data less than the native sector size.

5. Apparatus according to claim 3, wherein the block header forming means further comprises means for generating a constant sequence of characters for inclusion in each block header.

6. Apparatus according to claim 1, wherein the I/O channel is the I/O subsystem of a host processor system, and the recipient is the host processor, the I/O subsystem coupling the host processor system to a mass storage device controller via the serial data transfer medium.

7. Apparatus according to claim 6, wherein the user defined data include a plurality of pad data that are not used by the recipient, and the control means includes:

means for disabling the block header forming means, and means for stripping a plurality of pad data from the user defined data before transmission to the parallel storage medium, including means for providing signals to configure the switching means to disable transmission of a predetermined number of characters in the user defined data.

8. In an Input/Output (I/O) subsystem coupled to a serial data transfer medium that transmits data from a sender to a recipient, the I/O subsystem processing a frame comprising user defined data and frame control data received over the serial data transfer medium, apparatus comprising:

a processor for determining a native sector size of the recipient;

means coupled to the processor for receiving and storing the native sector size;

a first-in, first-out (FIFO) buffer;

means for receiving and validating the frame from the serial data transfer medium, and for transmitting the user defined data to the FIFO buffer;

means for forming an Error Detection Code (EDC) that has an EDC size and is used to detect errors in the user defined data, the EDC forming means being independent from the receiving means;

switching means connected to: (1) the FIFO buffer for receiving a subset of the user defined data having a subset size that is equal to a difference between the native sector size and the EDC size, and (2) to the EDC forming means for receiving the EDC, the switching means coupled to a data buffer for transmitting one of the subset of the user defined data and the EDC to the data buffer; and control means separate and distinct from the processor and operating without interfering with operation of the processor and independently therefrom, for providing signals that configure the switching means to successively transmit: (1) the subset of the user defined data until a number of bytes equal to the subset size have been transmitted to the data buffer and (2) the EDC, until a number of bytes equal to the native sector size have been transmitted to the data buffer, said native sector size being different from a size of the frame, wherein said control means provide said signals to the switching means based on how many bytes of data have been transmitted to the data buffer.

9. Apparatus according to claim 8, wherein the I/O channel is the I/O subsystem of a mass storage device controller, coupling the device controller to a host processor system via the serial data transfer medium, the device controller receiving the frame from the host processor and transmitting the user defined data in the data block to a mass storage device.

10. Apparatus according to claim 9, wherein the EDC forming means includes means for generating a parity bit for each respective byte of user defined data.

11. Apparatus according to claim 8, further comprising means for forming a block header having a block header size, the block header comprising control data that are used by the recipient, the block header forming means being distinct from the FIFO buffer, wherein:

the switching means is coupled to the block header forming means for receiving the block header data, and the control means provides further signals that configure the switching means to transmit the block header data until a number of bytes equal to the block header size are transmitted to the data buffer, before the subset of the user defined data is transmitted to the data buffer.

12. Apparatus according to claim 11, wherein:

(1) the mass storage device has a native sector size, the frame includes an amount of user defined data that is greater than the native sector size of the mass storage device, and the control means includes means for dividing the user defined data in the frame into a plurality of data blocks, each having an amount of data less than the native sector size;

(2) the block header forming means comprises:

(a) a counter for providing consecutively numbered block identification numbers for inclusion in the block header of each successive frame, each having an amount of data less than the native sector size, and (b) means for generating a constant sequence of characters for inclusion in each block header.

13. Apparatus according to claim 11, wherein the control means includes means for configuring the switching means to alternately transmit the block header and the user defined data to the data buffer, including means for disabling transmission of the EDC.

14. In an Input/Output (I/O) subsystem having a parallel storage medium that stores a data block having a block header and a plurality of user defined data, apparatus for transferring the user defined data from the parallel storage medium to a serial link driver that transmits a frame of user defined data from a sender to a recipient over a serial data transfer medium, comprising:

a processor for determining a device information block (DIB) size;

means coupled to the processor for receiving and storing the DIB size;

means for receiving the data block from the parallel storage medium, removing the block header therefrom, and storing the user defined data in a first-in, first-out (FIFO) buffer;

means coupled to the parallel storage medium for comparing a value in the block header to a predetermined value to determine whether the data block received by the FIFO buffer is a desired data block, and for disabling transmission of the frame if the data block is not the desired data block;

control data means for forming and transmitting control data from the sender of the frame to the recipient of the frame via a path that does not include the FIFO buffer, the control data having a control data size, the control data means being independent from the FIFO buffer and the processor and operating without interfering with operation of the processor;

switching means coupled to the FIFO buffer for receiving the user defined data and to the control data means for receiving the control data, the switching means being coupled to the serial link driver for providing one of the user defined data and the control data to the serial link driver; and data path control means separate and distinct from the processor and operating without interfering with operation of the processor and independently therefrom, for providing signals to configure the switching means to alternately transmit: (1) a number of bytes of the control data equal to the control data size and (2) a number of bytes of the user defined data equal to the DIB size to the serial link driver, thereby forming the frame, said data path control means providing said signals to the switching means based on how many bytes of data have been transmitted to the serial link driver.

15. Apparatus according to claim 14, wherein the I/O subsystem is the I/O subsystem of a mass storage device controller, coupling the device controller to a host processor system via the serial data transfer medium, the device controller receiving the data block from a mass storage device and transmitting the user defined data from the data block to the host processor in the frame.

16. Apparatus according to claim 15, wherein the comparing means includes:

means for examining a counter value within each data block received by the FIFO buffer, and means for flagging an error condition if successive blocks that have non-consecutive counter values are received.

17. Apparatus according to claim 14, wherein the I/O subsystem is the I/O subsystem of a host processor system, coupling the host processor system to a mass storage device controller, to transmit frames to the device controller via the serial data transfer medium.

18. Apparatus according to claim 14, further comprising:

means for disabling the comparing means; and means coupled to the switching means for generating a sequence of pad data characters, wherein the data path control means transmits signals to configure the switching means to transmit the sequence of pad characters after the user defined data are transmitted.

19. In an Input/Output (I/O) subsystem having a parallel storage medium that stores a data block having a block header, a plurality of user defined data and an error detection code (EDC), apparatus for transferring the user defined data from the parallel storage medium to a serial link driver that transmits a frame of user defined data from a sender to a recipient over a serial data transfer medium, comprising:

a processor for determining a device information block (DIB) size;

means coupled to the processor for receiving and storing the DIB size;

a first-in, first-out (FIFO) buffer which receives and stores the user defined data from the parallel storage medium;

means coupled to the parallel storage medium for comparing a value in the block header to a predetermined value to determine whether the data block in the parallel storage medium is a desired data block;

means for examining the user defined data in the FIFO buffer and the EDC to determine if any parity errors are present in the user defined data; and control data means for forming and transmitting control data from the sender of the frame to the recipient of the frame via a path that does not include the FIFO buffer, the control data having a control data size, the control data means being independent from the FIFO buffer and the processor and operating without interfering with operation of the processor;

switching means coupled to the FIFO buffer for receiving the user defined data and to the control data means for receiving the control data, the switching means coupled to the serial link driver for providing one of the user defined data and the control data to the serial link driver; and data path control means separate and distinct from the processor operating without interfering with operation of the processor and independently therefrom, for providing signals to configure the switching means to alternately transmit: (1) a number of bytes of the control data equal to the control data size and (2) a number of bytes of the user defined data equal to the DIB size to the serial link driver, thereby forming the frame, said data path control means providing said signals to the switching means based on how many bytes of data have been transmitted to the serial link driver.

20. Apparatus according to claim 19, wherein the I/O subsystem is the I/O subsystem of a mass storage device controller, coupling the device controller to a host processor system via the serial data transfer medium, and the recipient of the frame is a host processor system, the device controller receiving the data block from a mass storage device and transmitting the user defined data from the data block to the host processor within the frame.

* * * * *